(12) United States Patent
Atsuchi et al.

(10) Patent No.: US 11,815,019 B2
(45) Date of Patent: *Nov. 14, 2023

(54) PARTICLE SEPARATORS FOR TURBOMACHINES AND METHOD OF OPERATING THE SAME

(71) Applicant: General Electric Company, Schenectady, NY (US)

(72) Inventors: Satoshi Atsuchi, Niskayuna, NY (US); Corey Bourassa, Mechanicville, NY (US); James R. Noel, Lynn, MA (US); Erich Alois Krammer, West Chester, OH (US); Byron Andrew Pritchard, Niskayuna, NY (US); Mehmet Dede, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,095

(22) Filed: Apr. 14, 2021

(65) Prior Publication Data

US 2021/0388763 A1 Dec. 16, 2021

Related U.S. Application Data

(60) Continuation of application No. 17/200,355, filed on Mar. 12, 2021, which is a division of application No.
(Continued)

(51) Int. Cl.
*F02C 7/052* (2006.01)
*F02C 9/18* (2006.01)
(Continued)

(52) U.S. Cl.
CPC ............... *F02C 7/052* (2013.01); *F02C 3/06* (2013.01); *F02C 9/18* (2013.01); *B01D 45/08* (2013.01);
(Continued)

(58) Field of Classification Search
CPC ........ B01D 45/04; B01D 45/06; B01D 45/12; B01D 45/16; F05D 2260/607;
(Continued)

(56) References Cited

U.S. PATENT DOCUMENTS 3,237,386 A 3/1966 Farr
3,355,864 A 12/1967 Sobeck
(Continued)

*Primary Examiner* — Gerald L Sung
*Assistant Examiner* — Rene D Ford
(74) *Attorney, Agent, or Firm* — McGarry Bair PC

(57) ABSTRACT

A particle separator includes a separator body in a primary fluid passageway of a machine. The primary fluid passageway includes one or more bleed holes through which a diverted portion of the fluid flowing in the primary fluid passageway toward a volume of the machine is diverted into an auxiliary flow passageway that bypasses the volume and directs the diverted portion of the fluid toward one or more other components of the machine. The separator body is coupled with the inner wall and/or outer wall of the primary fluid passageway. The separator body includes an upstream edge positioned to separate at least some particles carried by the fluid from the fluid as the diverted portion of the fluid bends around and flows over the at least one upstream edge of the separator body and into the auxiliary flow passageway.

20 Claims, 13 Drawing Sheets

Related U.S. Application Data

16/186,834, filed on Nov. 12, 2018, now Pat. No. 10,995,666, which is a continuation-in-part of application No. 14/940,251, filed on Nov. 13, 2015, now Pat. No. 10,612,465.

(51) Int. Cl.
*F02C 3/06* (2006.01)
*B01D 45/08* (2006.01)

(52) U.S. Cl.
CPC .... *F05D 2220/32* (2013.01); *F05D 2260/607* (2013.01)

(58) Field of Classification Search
CPC .. F02C 7/052; F02C 7/055; F02C 6/08; F02C 9/18; B64D 2033/0246
See application file for complete search history.

(56) References Cited

U.S. PATENT DOCUMENTS

| | | |
|---|---|---|
| 3,452,542 A | 7/1969 | Saferstein et al. |
| 4,463,552 A | 8/1984 | Monhardt et al. |
| 4,466,239 A | 8/1984 | Napoli et al. |
| 4,500,332 A | 2/1985 | Gillingham |
| 4,704,145 A | 11/1987 | Norris et al. |
| 4,796,429 A | 1/1989 | Verdouw |
| 4,820,122 A | 4/1989 | Hall et al. |
| 4,820,123 A | 4/1989 | Hall |
| 5,139,545 A | 8/1992 | Mann |
| 5,211,003 A | 5/1993 | Samuel |
| 5,632,141 A | 5/1997 | Sloop et al. |
| 6,334,297 B1 | 1/2002 | Dailey et al. |
| 7,296,395 B1 | 11/2007 | Hartman et al. |
| 7,374,593 B2 | 5/2008 | Snyder |
| 7,412,834 B2 | 8/2008 | Bes et al. |
| 7,678,165 B2 | 3/2010 | Tingle et al. |
| 7,927,408 B2 | 5/2011 | Sheoran et al. |
| 8,240,121 B2 | 8/2012 | Hazzard et al. |
| 9,518,468 B2 * | 12/2016 | Tibbott .................... F01D 5/20 |
| 9,616,373 B2 | 4/2017 | Kinsey, Jr. et al. |
| 10,995,666 B2 * | 5/2021 | Atsuchi .................... F02C 3/06 |
| 2009/0126337 A1 | 5/2009 | Hazzard et al. |
| 2014/0230382 A1 | 8/2014 | Fuh et al. |
| 2016/0201688 A1 | 7/2016 | Lyons et al. |

\* cited by examiner

PARTICLE SEPARATORS FOR TURBOMACHINES AND METHOD OF OPERATING THE SAME

CROSS-REFERENCE TO RELATED APPLICATIONS

This application is a continuation of U.S. patent application Ser. No. 17/200,355, filed Mar. 12, 2021, which is a divisional of U.S. patent application Ser. No. 16/186,834, filed Nov. 12, 2018, now U.S. Pat. No. 10,995,666, issued May 4, 2021, which is a continuation-in-part of U.S. patent application Ser. No. 14/940,251, which was filed Nov. 13, 2015, now U.S. Pat. No. 10,612,465, issued Apr. 7, 2020, all of which are incorporated herein by reference in their entirety.

TECHNICAL FIELD

The field of the disclosure relates generally to a gas turbine engine and, more particularly, to a particle separator for turbomachines and method of enhancing particle removal in a turbomachine.

BACKGROUND

At least some known turbomachines, i.e., gas turbine engines, compress air via a plurality of rotatable compressor blades and ignite a fuel-air mixture in a combustor to generate combustion gases that are channeled through rotatable turbine blades via a hot gas path. Such known turbomachines convert thermal energy of the combustion gas stream to mechanical energy used to generate thrust and/or rotate a turbine shaft to power an aircraft. Output of the turbomachine may also be used to power a machine, for example, an electric generator, a compressor, or a pump.

Many of these known turbomachines include internal cooling air circuits for high temperature components. Air is drawn into the turbomachine during operation, channeled through the compressor, and into the cooling air circuits, thereby cooling selective components. Turbomachines frequently encounter conditions in which a high level of sand and/or particulate matter exists, such as deserts and air-polluted regions. When sand and/or particles enter the cooling air circuits, the particles accumulate around small features such as rims, film cooling holes, and turbulators. This accumulation of particles decreases the effectiveness of cooling the high temperature components. Cooling air is prevented from directly contacting heat transfer surfaces of the high temperature components. Additionally, alteration of high temperature component geometry and/or blocking film cooling holes by the particles also decreases the effectiveness of cooling the high temperature components. As a result, the anticipated service life of turbine components may be shortened, thereby resulting in unplanned engine downtime and increased maintenance costs.

BRIEF DESCRIPTION

In one embodiment, a particle separator includes a separator body configured to be disposed in a primary fluid passageway of a machine that directs a particle-carrying fluid along a flow path in the primary fluid passageway toward a volume of the machine. The primary fluid passageway located between opposing first and second walls. In one embodiment, these walls circumferentially extend around or encircle a centerline of the machine. Alternatively, these walls oppose each other without circumferentially extending around or encircling a centerline of the machine. For example, these walls may not be disposed in a rotating machine or a machine having a centerline. The primary fluid passageway includes one or more bleed holes through which a diverted portion of the fluid flowing in the primary fluid passageway is diverted into an auxiliary flow passageway that bypasses the volume and directs the diverted portion of the fluid toward one or more components of the machine that are outside of the volume of the machine. The separator body extends along the flow path from an upstream end that is configured to be coupled with the inner wall of the primary fluid passageway. The separator body includes at least one upstream edge positioned to separate at least some particles carried by the fluid from the fluid as the diverted portion of the fluid bends around and flows over the at least one upstream edge of the separator body and into the auxiliary flow passageway via the one or more bleed holes while a non-diverted portion of the fluid continues to flow along the flow path in the primary fluid passageway.

In one embodiment, a method includes establishing a fluid flow of particle-laden fluid in a primary fluid passageway of a machine that is defined by opposing first and second walls. These walls may circumferentially extend around or encircle the centerline of a machine having one or more rotating component. Alternatively, the walls may not circumferentially extend around or encircle the centerline of such a machine, the machine may not have a centerline, or the machine may not have a rotating component. The method also can include filtering a first portion of the particle-laden fluid by passing the particle-laden fluid over an undulating separator body having one or more separator openings that extends over at least one bleed hole through the first wall. The first portion of the particle-laden fluid is filtered by the first portion of the particle-laden fluid bending around an edge of the separator body at the one or more separator openings and flowing into an auxiliary fluid passageway. A second portion of the fluid passes over the separator body without being filtered by the separator body. The method also includes directing the first portion of the fluid that is filtered to one or more downstream components of the machine.

In one embodiment, a particle separator is provided. The particle separator includes a separator body configured to be disposed in a primary fluid passageway of a turbomachine that directs a particle-carrying fluid along a flow path in the primary fluid passageway toward a combustor of the turbomachine. The primary fluid passageway of the turbomachine is located between an inner wall and an outer wall that is disposed radially outside of the inner wall from a centerline of the turbomachine. A rotor assembly of the turbomachine rotates around the centerline of the turbomachine. The primary fluid passageway includes one or more air bleed holes through which a diverted portion of the fluid flowing in the primary fluid passageway toward the combustor is diverted into an auxiliary flow passageway that bypasses the combustor and directs the diverted portion of the fluid toward one or more components of the turbomachine that are downstream of the combustor in the turbomachine. The separator body extends along the flow path from an upstream end that is configured to be coupled with the inner wall of the primary fluid passageway. The separator body includes at least one upstream edge positioned to separate at least some particles carried by the fluid from the fluid as the diverted portion of the fluid bends around and flows over the at least one upstream edge of the separator body and into the auxiliary flow passageway via the one or more cooing air bleed holes while a non-diverted portion of the fluid continues to flow along the flow path in the primary fluid passageway.

In one embodiment, a method includes establishing a fluid flow of particle-laden air in a primary fluid passageway of a turbomachine that is defined by an inner wall and a radially outward wall relative to a centerline of the turbomachine, filtering a first portion of the particle-laden air by passing the particle-laden air over an undulating separator body having one or more separator openings, that is coupled with the inner wall of the primary fluid passageway, and that extends over at least one air bleed hole through the inner wall. The first portion of the particle-laden air is filtered by the first portion of the particle-laden air bending around an edge of the separator body at the one or more separator openings and flowing into an auxiliary fluid passageway. A second portion of the air passes over the separator body without being filtered by the separator body. The method also includes directing the first portion of the air that is filtered around a combustor of the turbomachine to one or more downstream components of the turbomachine while the second portion of the air is directed into the combustor of the turbomachine.

In one embodiment, a turbomachine includes a compressor section configured to receive particle-laden air and to at least partially compress the particle-laden air and a primary fluid passageway fluidly coupled with the compressor section and including opposing inner and radially outward walls. The primary fluid passageway is configured to receive the particle-laden air that is compressed by the compressor section. The primary fluid passageway includes one or more air bleed holes in one or more of the inner wall or the outer wall that are fluidly coupled with an auxiliary flow passageway. The turbomachine also includes a combustor section fluidly coupled with the compressor section by the primary fluid passageway. The combustor section is configured to combust an unfiltered portion of the particle-laden air and form combustion gases. The turbomachine also includes a turbine section fluidly coupled with the combustor section and configured to receive the combustion gases from the combustor section. The turbine section includes turbine stages configured to be coupled with a rotor section and that are configured to be rotated by the combustion gases to rotate the rotor section. The turbine section also is fluidly coupled with the auxiliary flow passageway. The turbomachine also includes a separator body configured to be disposed in the primary fluid passageway downstream of the compressor section and upstream of the combustor section along a flow path of the particle-laden air. The separator body includes at least one upstream edge positioned to separate at least some particles carried from the particle-laden air as a diverted portion of the particle-laden air bends around and flows over the at least one upstream edge of the separator body and into the auxiliary flow passageway via the one or more cooing air bleed holes while a non-diverted portion of the particle-laden air continues to flow over the separator body and along the flow path in the primary fluid passageway to the combustor section. The auxiliary flow passageway bypasses the combustor section and directs the diverted portion of the fluid toward the turbine stages via the auxiliary flow passageway.

In one embodiment, a particle separator for a turbomachine is provided. The turbomachine includes a first wall and a second wall at least partially defining at least one primary fluid passage. The first wall further defines at least one auxiliary fluid passage. The particle separator includes a first portion including a first end and a second end opposite the first end. The first end is coupled to the first wall. The second end extends from the first wall into the at least one primary fluid passage and extends in a direction at least partially defined by a direction of fluid flow through the at least one primary fluid passage. The second end and the first wall at least partially define at least one fluid diversion passage coupled in flow communication with the at least one primary fluid passage and the at least one auxiliary fluid passage. The at least one fluid diversion passage is configured to divert fluid from the at least one primary fluid passage to the at least one auxiliary fluid passage in a direction at least partially opposed to the direction of fluid flow through the at least one primary fluid passage.

In one embodiment, a turbomachine is provided. The turbomachine includes a compressor, a turbine rotatably coupled to the compressor, and a combustor coupled in flow communication with the compressor and the turbine. The turbomachine further includes a combustor bypass system including a first wall and a second wall at least partially defining at least one primary fluid passage. The first wall further defines at least one auxiliary fluid passage. The turbomachine further includes a particle separator including a first portion. The first portion includes a first end and a second end opposite the first end. The first end is coupled to the first wall. The second end extends from the first wall into the at least one primary fluid passage and extends in a direction at least partially defined by a direction of fluid flow through the at least one primary fluid passage. The second end and the first wall at least partially define at least one fluid diversion passage coupled in flow communication with the at least one primary fluid passage and the at least one auxiliary fluid passage. The at least one fluid diversion passage is configured to divert fluid from the at least one primary fluid passage to the at least one auxiliary fluid passage in a direction that is at least partially opposed to the direction of fluid flow through the at least one primary fluid passage.

In one embodiment, a method of enhancing particle removal from a fluid flow in a turbomachine is provided. The turbomachine includes a first wall and a second wall at least partially defining at least one primary fluid passage. The first wall further defines at least one auxiliary fluid passage. The turbomachine further includes a particle separator including a first portion. The first portion includes a first end and a second end opposite the first end. The first end is coupled to the first wall. The second end extends from the first wall into the at least one primary fluid passage and extends in a direction at least partially defined by a direction of fluid flow through the at least one primary fluid passage. The second end and the first wall at least partially define at least one fluid diversion passage. The method includes inducing a fluid flow in the turbomachine. The method also includes establishing primary fluid flow through the at least one primary fluid passage. The method further includes establishing auxiliary fluid flow through the at least one auxiliary fluid passage including diverting at least a portion of the primary fluid flow through the at least one fluid diversion passage. The at least one fluid diversion passage diverts fluid flow from the at least one primary fluid passage to the at least one auxiliary fluid passage in a direction that is at least partially opposed to the direction of fluid flow through the at least one primary fluid passage

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
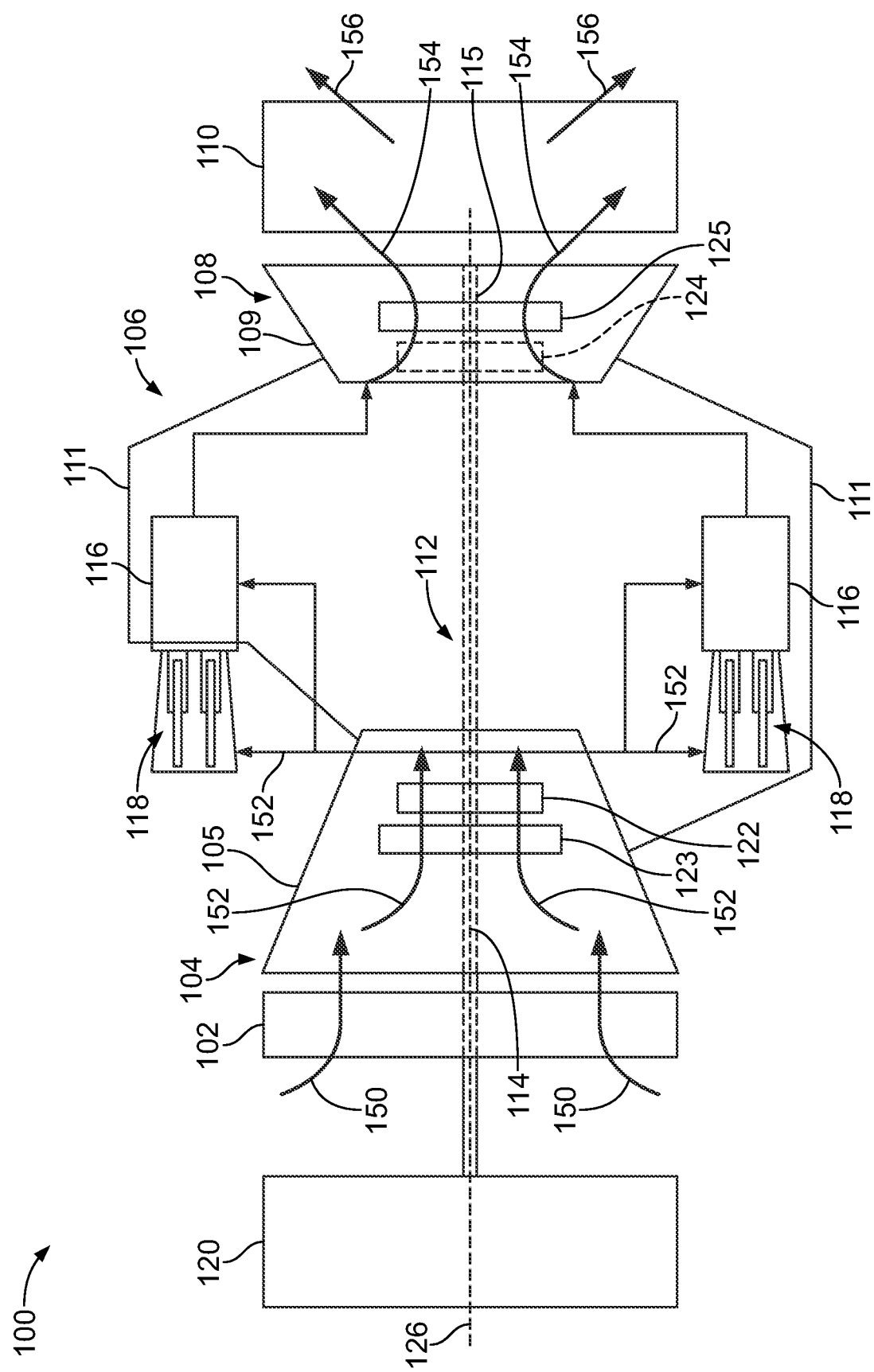
FIG. 1 is a schematic diagram of an exemplary turbomachine, i.e., a turbine engine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not. Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Particle separating devices described herein provide a cost-effective method for reducing sand particles and/or particulate matter within the flow of fluids within turbomachines. For example, the devices described herein can be used to filter particulates from the flow of air in cooling systems of turbomachines, from the flow of purge air directed to seals of turbomachines, to filter other fluids outside of turbomachines, etc. While the description herein may focus on use of separating devices for filtering cooling air in turbomachines, not all embodiments are so limited. One or more embodiments of the inventive subject matter described herein can be used to filter particulates from other fluids and/or for systems other than cooling systems of turbomachines. Specifically, to reduce particles within the flow of a fluid, the particle separators described herein utilize the difference in inertia between particles and fluid molecules as a separation mechanism. The particle separator is located over a extraction hole serving as a particle shield such that particles are restricted from directly entering the cooling passage. Additionally, the particle separator modifies a cross-sectional area of a flow passage, accelerating particle-laden flow therein. A fluid is routed through a fluid diversion passage within the particle separator. Particle-laden fluid flow has to turn approximately 180° at the fluid diversion passage such that particles with higher inertia are separated and carried downstream. As such, the amount of particles traveling into the diversion passage is substantially decreased. The particle separators described herein offer advantages that include, without limitation, cost effective implementation and retro fit application. Additionally, the particle separators described herein, have a lower weight than many known particle separators, thereby reducing any weight penalties in an aircraft engine retrofit. Moreover, use of the particle separators describe herein maintain the effectiveness of cooling systems within turbomachines by reducing particle accumulation around small features such as rims, film cooling holes, and turbulators, which extends engine component service life, and reduces engine downtime and maintenance costs.

As used herein, the terms "axial" and "axially" refer to directions and orientations which extend substantially parallel to a centerline 126, as shown in FIG. 1, of a turbine engine. Moreover, the terms "radial" and "radially" refer to directions and orientations which extend substantially perpendicular to the centerline of the turbine engine. In addition, as used herein, the terms "circumferential" and "circumferentially" refer to directions and orientations which extend arcuately about the centerline of the turbine engine. The term "fluid," as used herein, includes any medium or material that flows, including, but not limited to air.

FIG. 1 is a schematic view of a rotary machine 100, i.e., a turbomachine, and more specifically, a turbine engine. In the exemplary embodiment, turbine engine 100 is an aircraft engine. Alternatively, turbine engine 100 is any other turbine engine and/or rotary machine, including, without limitation, a gas turbine engine. In the exemplary embodiment, turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 100 is enclosed within a turbine casing 109 and includes an exhaust section 110 that is downstream from turbine section 108. A combustor housing 111 extends about combustor section 106 and is coupled to compressor casing 105 and turbine casing 109. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a fan assembly 120 via drive shaft 114. Alternatively, aircraft engine 100 may be a gas turbine engine and for example, and without limitation, be rotatably coupled to an electrical generator and/or a mechanical drive application, e.g., a pump. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., blade 125 and at least one adjacent stationary nozzle assembly 124. Each compressor blade assembly 122 and each turbine blade 125 is coupled to rotor assembly 112, or, more specifically, compressor drive shaft 114 and turbine drive shaft 115.

In operation, an intake section 102 channels a fluid 150 (such as but not limited to air) toward compressor section 104. Compressor section 104 compresses inlet fluid 150 to higher pressures and temperatures prior to discharging compressed fluid 152 towards combustor section 106. Compressed air 152 is channeled to fuel nozzle assembly 118, mixed with fuel (not shown), and burned within each combustor 116 to generate combustion gases 154 that are channeled downstream towards turbine section 108. After impinging turbine blade 125, thermal energy is converted to mechanical rotational energy that is used to drive rotor assembly 112. Turbine section 108 drives compressor section 104 and/or fan assembly 120 via drive shafts 114, 115, and exhaust gases 156 are discharged through exhaust section 110 to ambient atmosphere.

Figure 2:
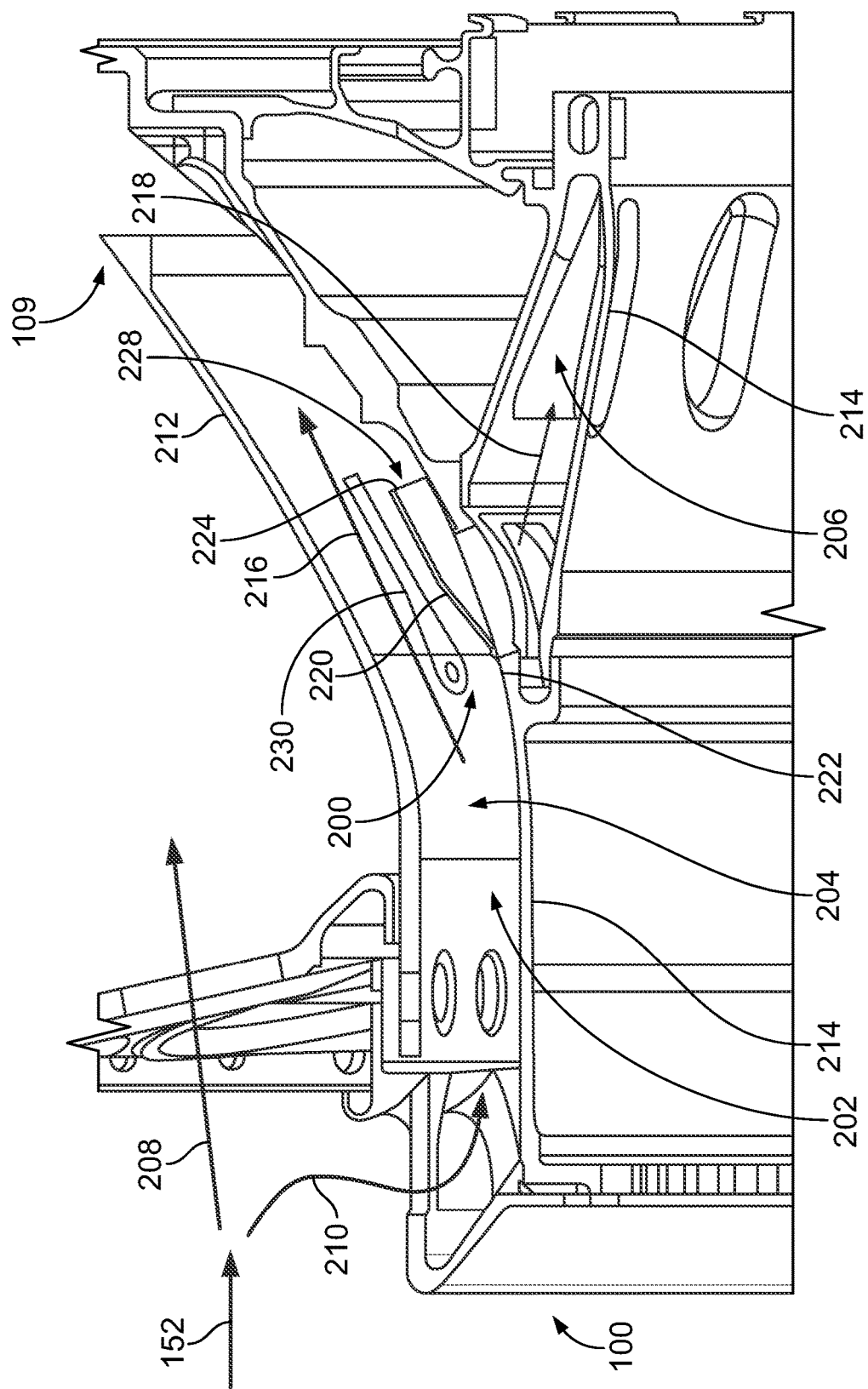
FIG. 2 is a schematic view of an exemplary particle separator that may be used with the turbine engine shown in FIG. 1.

FIG. 2 is a schematic view of an exemplary particle separator 200 that may be used with turbine engine 100. In the exemplary embodiment, turbine engine 100 includes a handling system 202 that channels a fluid toward one or more components such as blade 125 (shown in FIG. 1). For example, the handling system 202 may direct cooling air toward one or more air-cooled components, such as one or more turbine blades 125. The handling system 202 includes at least one primary fluid passage 204, such as a combustor bypass passage, coupled in flow communication with at least one auxiliary fluid passage 206, such as a cooling air passage. Compressed fluid 152 discharged from compressor section 104 (shown in FIG. 1) is split into a combustion flow 208 channeled towards combustor section 106 (shown in FIG. 1) and a combustor bypass flow 210 channeled around combustor section 106 (shown in FIG. 1) within primary fluid passage 204.

Combustor bypass flow 210 includes a primary fluid flow 216 through primary fluid passage 204 and an auxiliary fluid flow 218 through auxiliary fluid passage 206. Primary fluid flow 216 flows through primary fluid passage 204 that is defined by a second wall 212 and a first wall 214. First wall 214 further defines auxiliary fluid passage 206. Auxiliary fluid flow 218 flows through auxiliary fluid passage 206 towards the air-cooled component.

In the exemplary embodiment, particle separator 200 includes a first portion 220. First portion 220 has a first end 222 and a second end 224 opposite first end 222. First end 222 of first portion 220 is coupled to first wall 214. Second end 224 of first portion 220 extends radially from first wall 214 into primary fluid passage 204 and extends axially from first end 222 of first portion 220 in a direction defined by primary fluid flow 216 through primary fluid passage 204. Second end 224 of first portion 220 and first wall 214 define at least one fluid diversion passage 228. Fluid diversion passage 228 is coupled in flow communication with primary fluid passage 204 and auxiliary fluid passage 206. Fluid diversion passage 228 diverts fluid from primary fluid passage 204 to auxiliary fluid passage 206 in a direction that is opposed to primary fluid flow 216 through primary fluid passage 204.

Furthermore, in the exemplary embodiment, particle separator 200 includes a flow member 230 disposed within primary fluid passage 204 between second wall 212 and first portion 220. Flow member 230 extends axially in a direction defined by primary fluid flow 216 through primary fluid passage 204. Additionally, flow member 230 is disposed within primary fluid passage 204 at a radial distance from first wall 214 within a range from greater than or equal to 20 percent of primary fluid passage radial height to less than or equal to 90 percent of primary fluid passage radial height. Flow member 230 is configured to straighten and/or divide primary fluid flow 216. By creating a more uniform primary fluid flow 216, particle separation efficiency increases at particle separator 200. Flow member 230 is coupled to at least one of first wall 214, second wall 212, and first portion 220. In the exemplary embodiment, flow member 230 has a curvature that is substantially similar to the curvature of second wall 212. In alternative embodiments, flow member 230 may have any other shape that allows particle separator 200 to operate as described herein. In other alternative embodiments, particle separator 200 does not include flow member 230.

Figure 3:
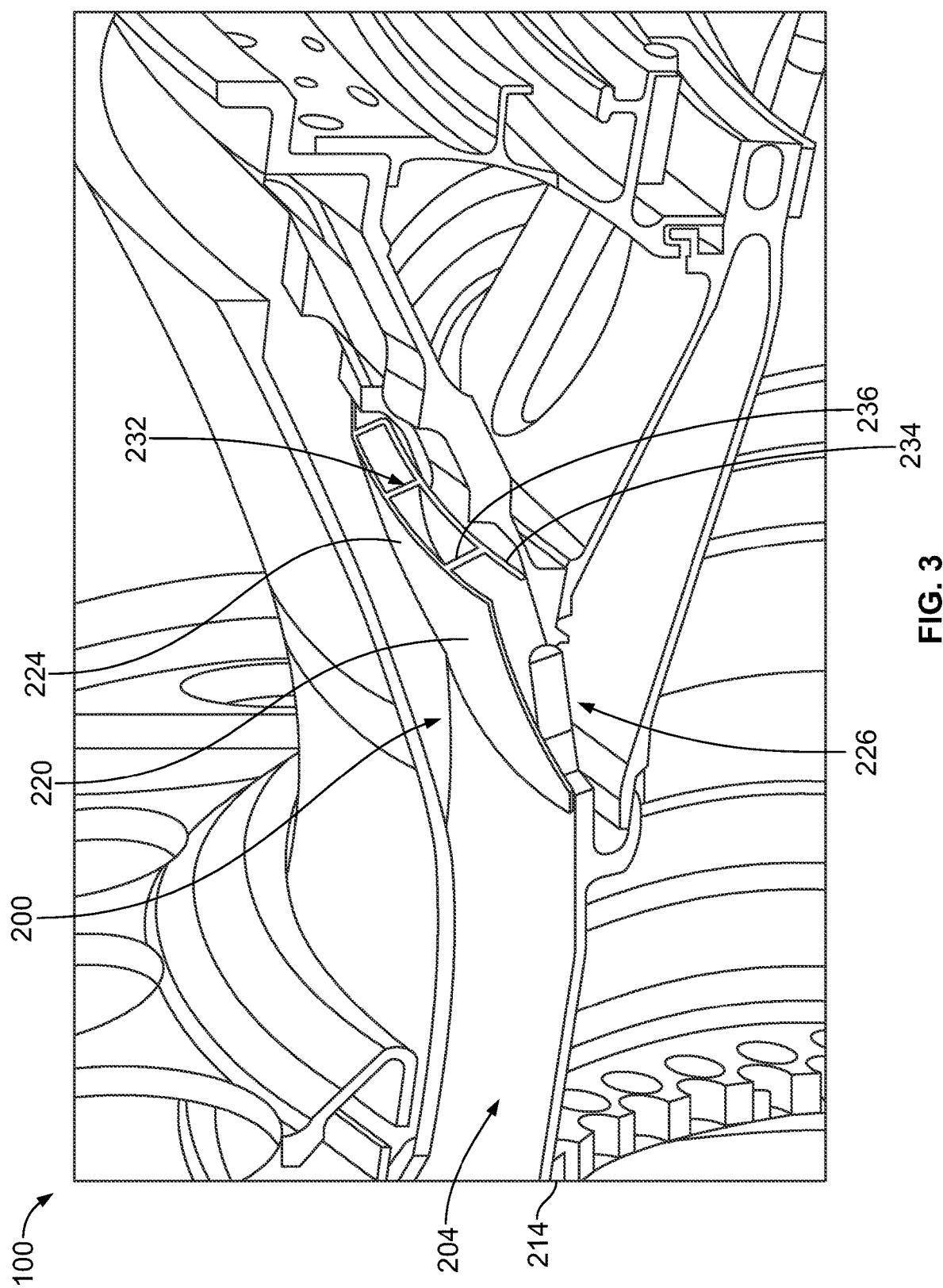
FIG. 3 is a perspective view of the particle separator shown in FIG. 2.

FIG. 3 is a perspective view of particle separator 200 that may be used with turbine engine 100. As described above, particle separator 200 is coupled to first wall 214 at first end 222 of first portion 220. Particle separator 200 further includes a support device 232 including a coupling member 234 and a plurality of support members 236. Support members 236 are coupled to coupling member 234 and extend radially from first wall 214 into primary fluid passage 204. Coupling member 234 is coupled to first wall 214 and support members 236 are coupled to second end 224 of first portion 220.

In the exemplary embodiment, first portion 220 and support device 232 are unitary. In some alternative embodiments, first portion 220, flow member 230, and support device 232 are unitary. In some other alternative embodiments, first portion 220, support device 232, and flow member 230 are separate members that are coupled together. As shown in FIG. 3, particle separator 200 spans substantially circumferentially across primary fluid passage 204 and extends over inlet hole 226. In some alternative embodiments, particle separator 200 is a discrete member that extends over inlet hole 226 only and does not span circumferentially across primary fluid passage 204. Additionally, particle separator 200 is made from sheet metal or any other suitable material.

Figure 4:
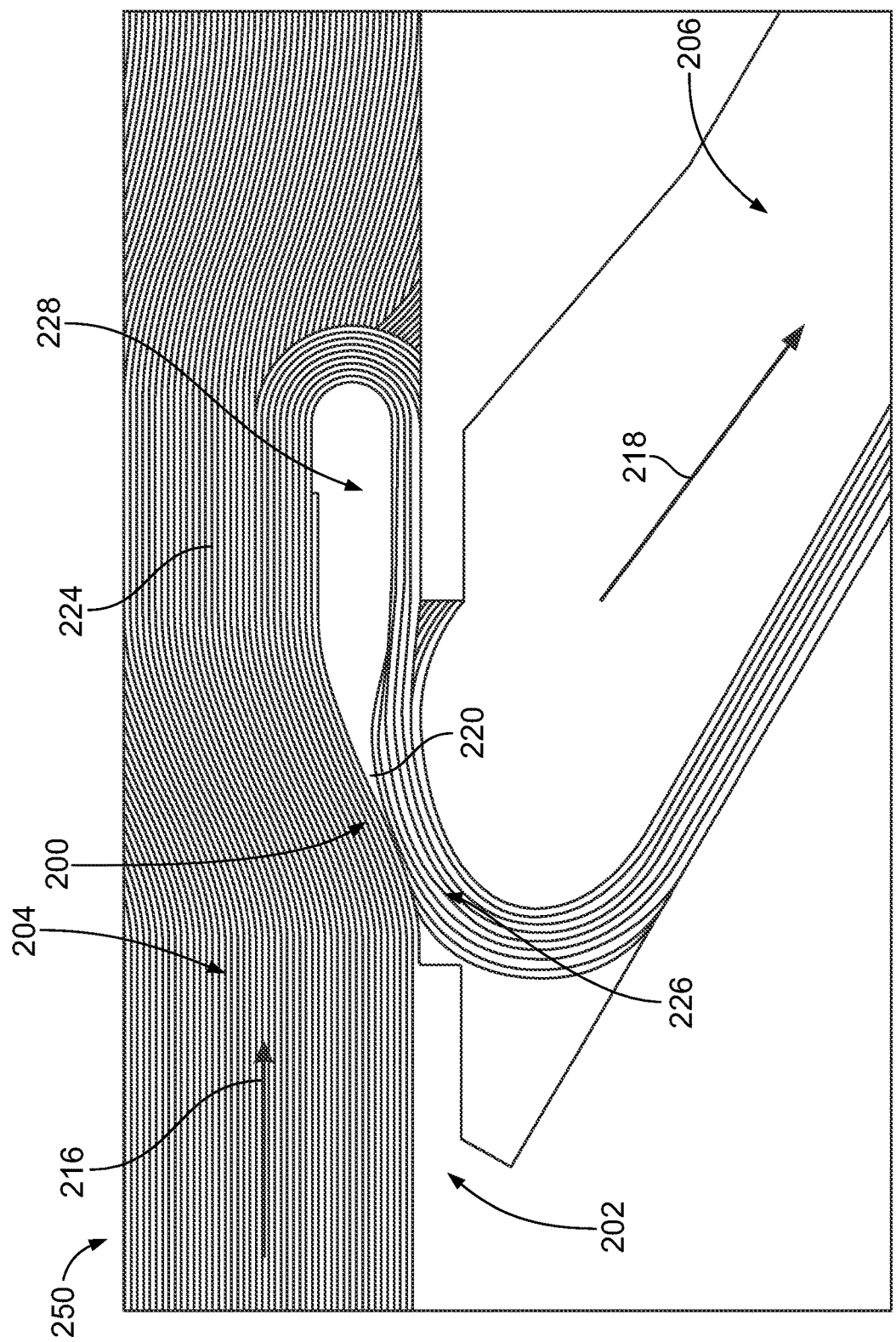
FIG. 4 is a flow characteristic diagram of the particle separator shown in FIG. 2.

FIG. 4 is a flow characteristic diagram 250 of the particle separator 200 as described above. Flow characteristic diagram 250 shows particle trajectories within cooling system 202. Particle-laden primary fluid flow 216 is channeled through primary fluid passage 204. First portion 220 of particle separator 200 extends over inlet hole 226 which reduces direct particle entry into auxiliary fluid passage 206 from particle-laden primary fluid flow 216.

Particle entry into auxiliary fluid passage 206 is also reduced by fluid properties created by particle separator 200. Particles are separated within the flow by the difference in inertia between particles and air molecules. First portion 220 has a ramp-like shape that accelerates particle-laden primary fluid flow 216 in an axial direction by reducing the cross-sectional area of primary fluid passage 204. In the exemplary embodiment, fluid flow is accelerated to approximately a Mach number of 0.1 or higher. Although, it is appreciated that any acceleration that increases inertia of particles will reduce particles in auxiliary fluid passage 206.

When primary fluid flow 216 is accelerated, the particles have a greater amount of inertia than the fluid molecules. Auxiliary fluid flow 218, which can be used for cooling or other purposes, is diverted from primary fluid flow 216 through fluid diversion passage 228. This diversion forces auxiliary fluid flow 218 to turn approximately 180° around second end 224 of first portion 220 before entering auxiliary fluid passage 206. The particles having high inertia are removed through centrifugal force and carried further downstream with primary fluid flow 216. The clear area in FIG. 4 around fluid diversion passage 228 shows that particle entry into auxiliary fluid passage 206 is reduced and auxiliary fluid flow 218, which makes the turn at fluid diversion passage 228, contains fewer particles as shown in FIG. 5, discussed below.

Figure 5:
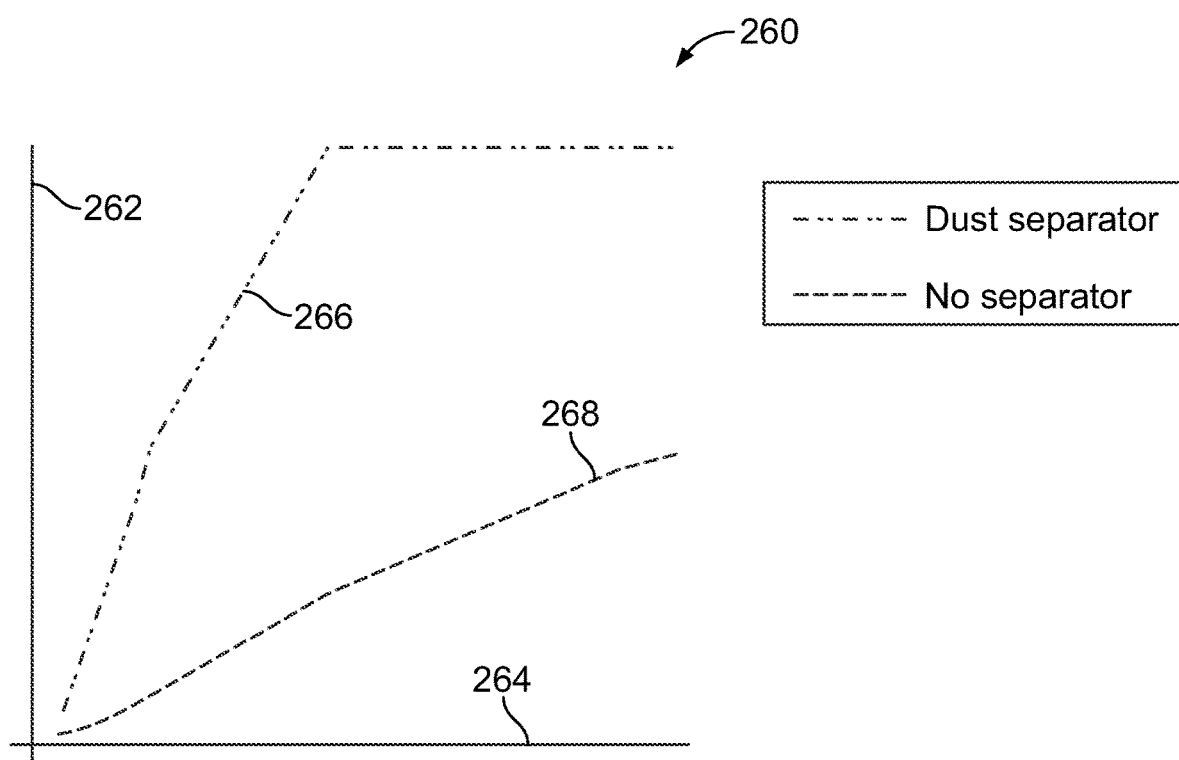
FIG. 5 is a separation graph for the particle separator shown in FIG. 2.

FIG. 5 is a separation graph 260 that includes a y-axis 262 defining efficiency of particle separation from auxiliary fluid flow 218. Graph 260 also includes an x-axis 264 defining particle size. Graph 260 shows two efficiency of particle separation versus particle size curves for auxiliary fluid flow. The uppermost curve 266 is the curve for auxiliary fluid flow 218 with particle separator 200 extending over cooling inlet hole 226. The lowermost curve 268 is the curve for auxiliary fluid flow 218 without particle separator 200 extending over inlet hole 226. The higher the efficiency of particle separation, the cleaner the fluid.

Figure 6:
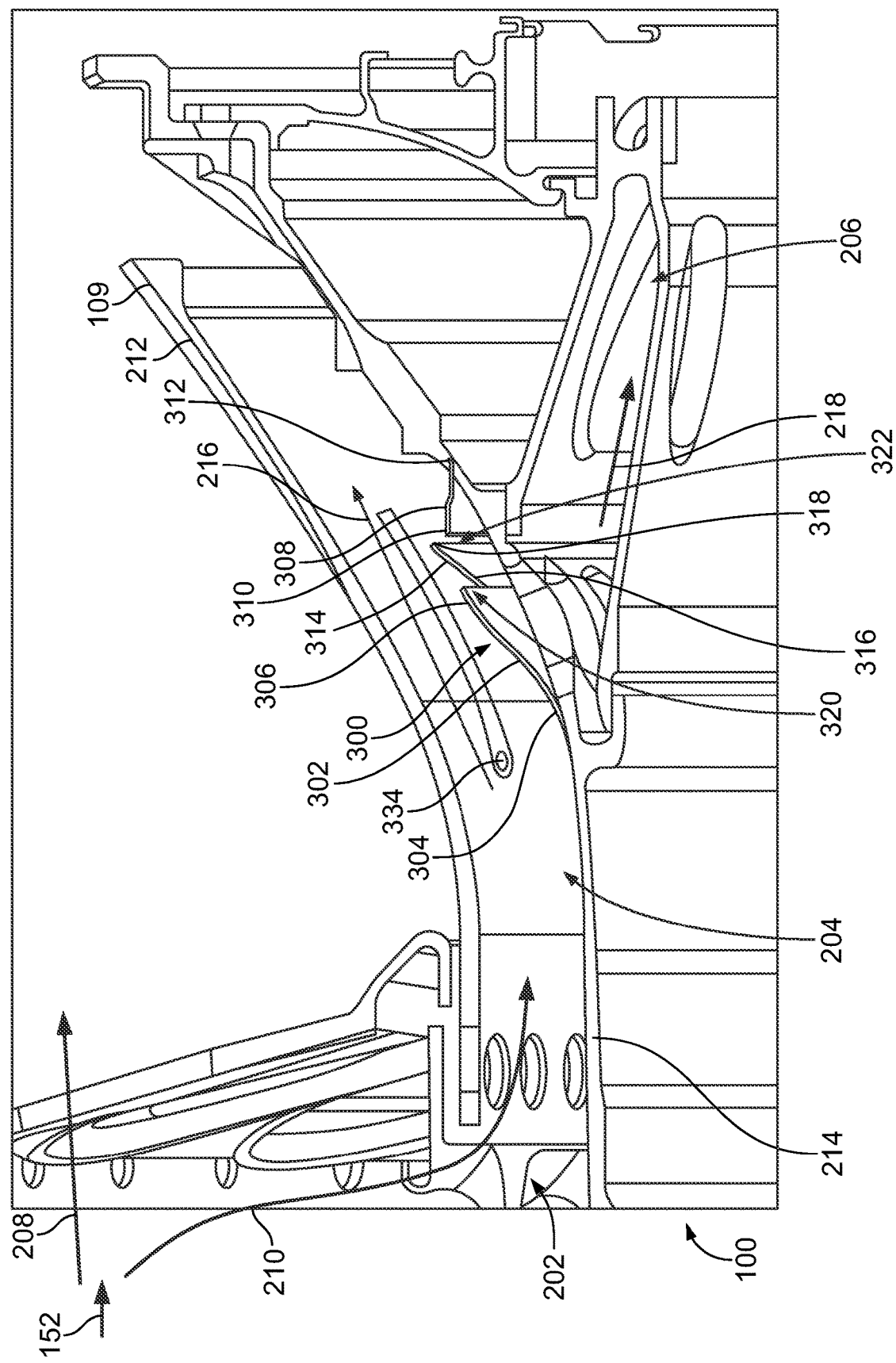
FIG. 6 is a schematic view of an alternative particle separator that may be used with the turbine engine shown in FIG. 1.

FIG. 6 is a schematic view of an alternative particle separator 300 that may be used with turbine engine 100. In this alternative embodiment, turbine engine 100 includes a handling system 202 that channels fluid toward another component as described above in reference to FIG. 2. As one example, the handling system 202 may be a cooling system that channels cooling air toward one or more air-cooled components. In this alternative embodiment, particle separator 300 includes a first portion 302, a second portion 308, and at least one third portion 314. First portion 302 has a first end 304 and a second end 306 opposite first end 304. First end 304 of first portion 302 is coupled to first wall 214. Second end 306 of first portion 302 extends radially from first wall 214 into primary fluid passage 204 and extends axially from first end 304 of first portion 302 in a direction defined by primary fluid flow 216 through primary fluid passage 204. Second portion 308 also has a first end 310 and a second end 312 opposite first end 310. First end 310 of second portion 308 extends radially from first wall 214 into primary fluid passage 204. First end 310 of second portion 308 extends axially in a direction opposed to primary fluid flow 216 through primary fluid passage 204. Second end 312 of second portion 308 is coupled to first wall 214. In some alternative embodiments, second portion 308 extends in a direction substantially normal to primary fluid flow 216 through primary fluid passage 204. In some other alternative embodiments, second portion 308 extends in a direction substantially aligned to primary fluid flow 216 through primary fluid passage 204.

In this alternative embodiment, particle separator 300 includes third portion 314 between first portion 302 and second portion 308. Third portion 314 has a first end 316 and a second end 318 opposite first end 316. Third portion 314 extends axially in a direction defined by primary fluid flow 216 through primary fluid passage 204. At least one first fluid diversion passage 320 is defined by second end 306 of first portion 302 and first end 316 of third portion 314. At least one second fluid diversion passage 322 is defined by second end 318 of third portion 314 and first end 310 of second portion 308. First and second fluid diversion passages 320, 322 are coupled in flow communication with primary fluid passage 204 and auxiliary fluid passage 206. First and second fluid diversion passages 320, 322 divert fluid from primary fluid passage 204 to auxiliary fluid passage 206 in a direction that is opposed to primary fluid flow 216 through primary fluid passage 204.

Also, in this alternative embodiment, first portion 302, second portion 308, and third portion 314 are shown as substantially "S" shaped. For example, first end 316 of third portion 314 has a local curvature radius (first curve in the "S") greater than or equal to 10 percent of third portion 314 axial length, and second end 318 of third portion 314 has a local curvature radius (second curve in the "S") greater than or equal to 20 percent of third portion 314 axial length. Moreover, for example, second end 318 of third portion 314 has a flap angle (end angle curved either towards first wall 214 or second wall 212) within a range from less than or equal to 10 degrees into second wall 212 (such that end angle curves toward second wall 212) to less than or equal to 60 degrees into first wall 214 (such that end angle curves towards first wall 214). The flap angle also has a local curvature radius of greater than or equal to 50 percent of second gap height 332 (discussed further below). Furthermore, for example, second end 318 of third portion 314 and first end 310 of second portion 308 are spaced from one another within a range from axially overlapping one another at a distance of approximately twice the second gap height 332 to having an axial gap between one another with a distance of approximately twice the second gap height 332. Also, for example, the angle between second end 318 of third portion 314 and first end 310 of second portion 308 is within a range from greater than or equal to 0 degrees (such that second end 318 of third portion 314 and first end 310 of second portion 308 are parallel) to less than or equal to 60 degrees. Alternatively, first portion 302, second portion 308, and third portion 314 are other shapes, including, but not limited to, flat, "L" shaped, and "C" shaped.

Furthermore, in this alternate embodiment, particle separator 300 includes a flow member 334 disposed within primary fluid passage 204 between second wall 212 and first portion 302, second portion 308, and third portion 314. Flow member 334 extends axially in a direction defined by primary fluid flow 216 through primary fluid passage 204. Additionally, flow member 334 is disposed within primary fluid passage 204 at a radial distance from first wall 214 within a range from greater than or equal to 20 percent of primary fluid passage radial height to less than or equal to 90 percent of primary fluid passage radial height. Flow member 334 is configured to straighten and/or divide primary fluid flow 216. By creating a more uniform primary fluid flow 216, particle separation efficiency increases at particle separator 300. Flow member 334 is attached to at least one of first wall 214, second wall 212, first portion 302, second portion 308, and third portion 314. In the exemplary embodiment, flow member 334 has a curvature that is substantially similar to the curvature of second wall 212. In alternative embodiments, flow member 334 may have any other shape that allows particle separator 300 to operate as described herein. In other alternative embodiments, particle separator 300 does not include flow member 334.

Figure 7:
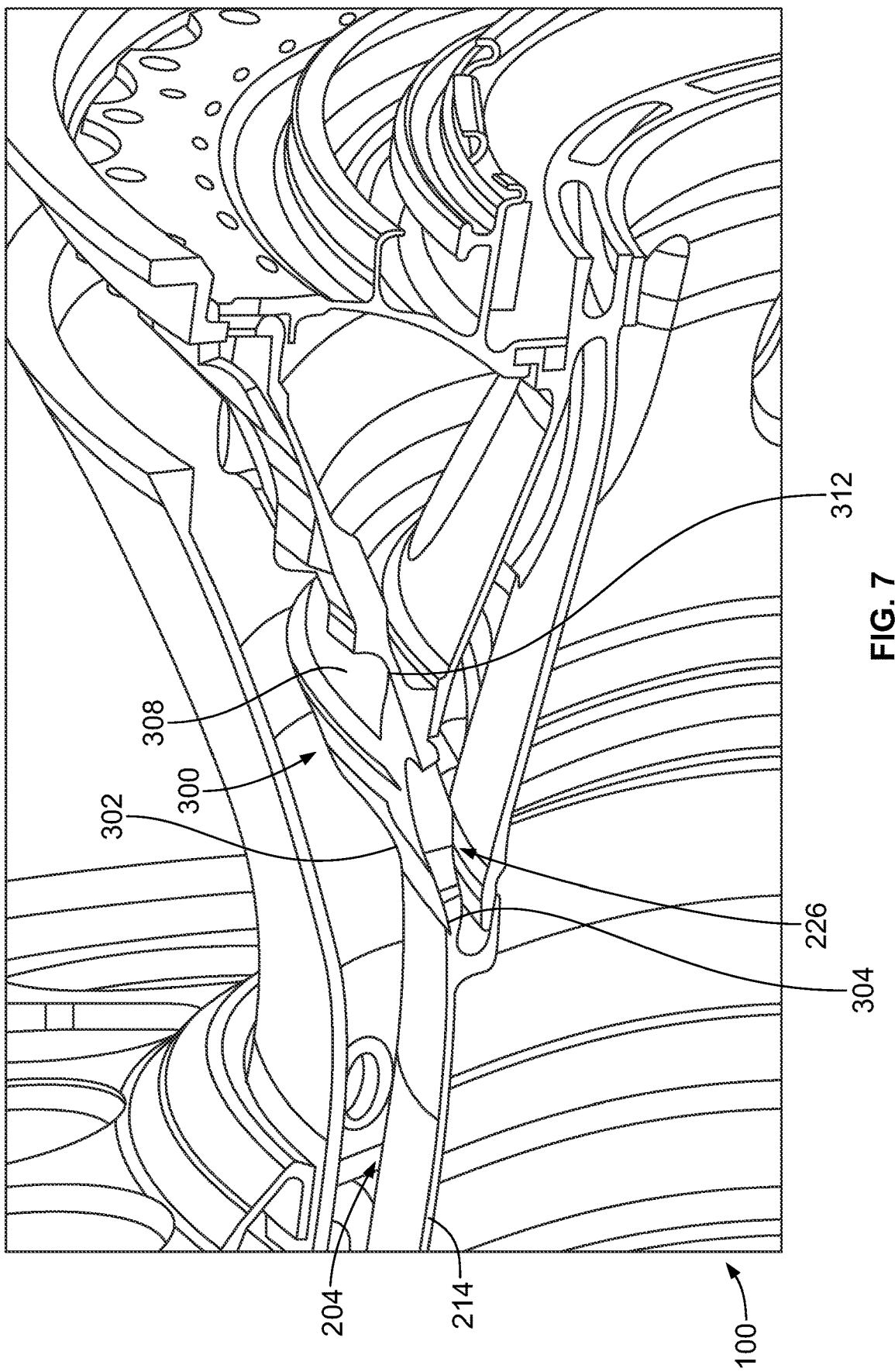
FIG. 7 is a perspective view of the particle separator shown in FIG. 6.

FIG. 7 is a perspective view of particle separator 300 that may be used with turbine engine 100. As described above, particle separator 300 is coupled to first wall 214 at first end 304 of first portion 302 and second end 312 of second portion 308. In this alternative embodiment, first portion 302, second portion 308, and third portion 314 are unitary. In some alternative embodiments, first portion 302, second portion 308, and third portion 314 are separate members that are coupled together. As shown in FIG. 7, particle separator 300 spans substantially circumferentially across primary fluid passage 204 and extends over inlet hole 226. In some alternative embodiments, particle separator 300 is a discrete member that extends over cooling inlet hole 226 only and does not span circumferentially across primary fluid passage 204.

Figure 8:
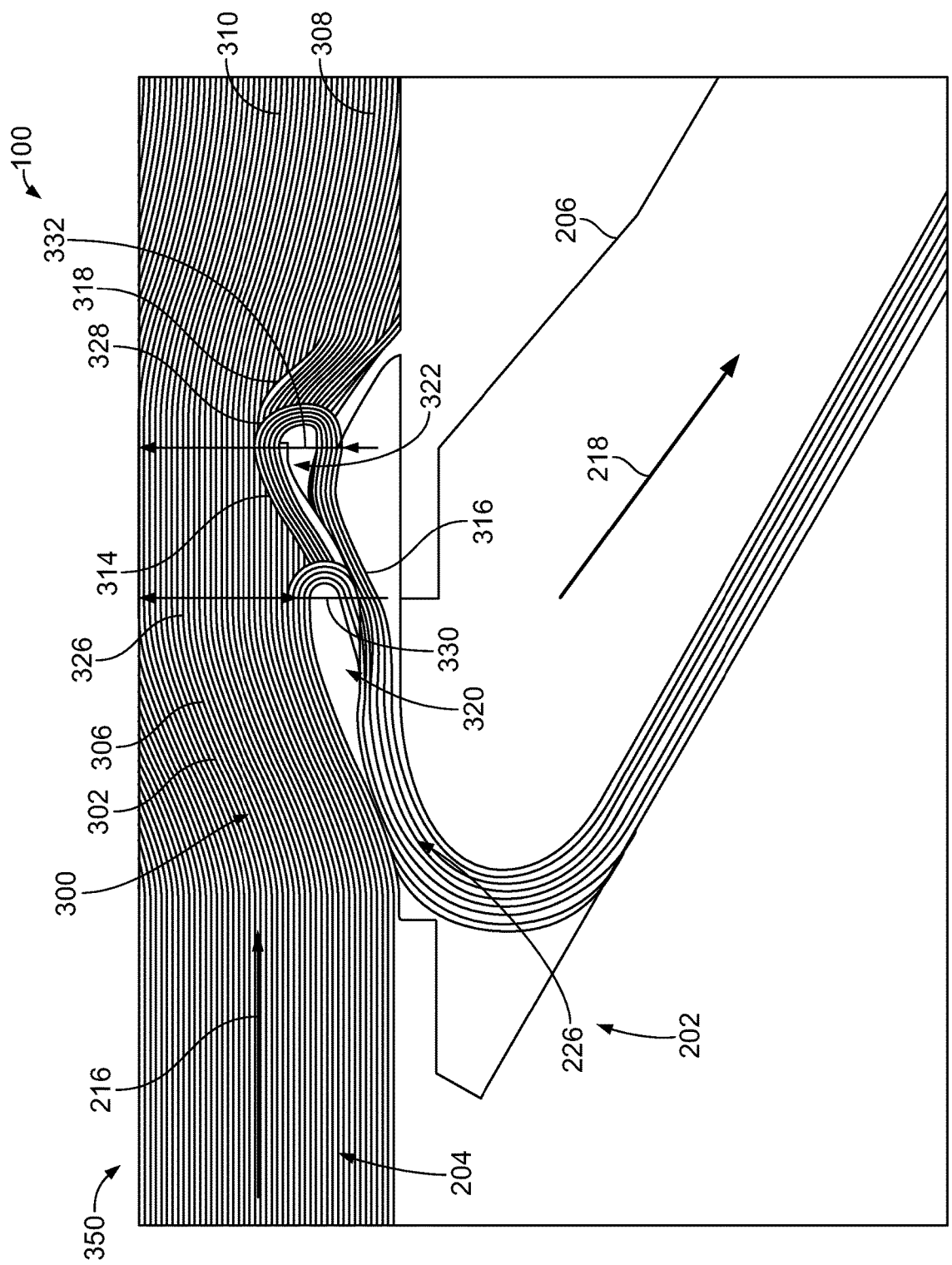
FIG. 8 is a flow characteristic diagram of the particle separator shown in FIG. 6.

FIG. 8 is a flow characteristics diagram 350 of particle separator 300 as described above. Flow characteristic diagram 350 shows particle trajectories within the handling system or cooling system 202. Particle-laden primary fluid flow 216 is channeled through primary fluid passage 204. Particle separator 300 extends over inlet hole 226 which reduces direct particle entry into auxiliary fluid passage 206 from particle-laden primary fluid flow 216.

Particle entry into auxiliary fluid passage 206 is also reduced by fluid properties created by particle separator 300, similar to the fluid properties discussed above in reference to FIG. 4. First portion 302 and third portion 314 create a ramp-like shape that accelerates particle-laden primary fluid flow 216 in an axial direction by reducing the cross-sectional area of primary fluid passage 204. Additionally, second portion 308 further improves particle separation effectiveness by promoting attached continuous flow. In this alternative embodiment, second portion 308 has a convex fairing downstream. In some alternative embodiments, second portion 308 is any suitable shape that enables operation of particle separator 300 as described herein.

Auxiliary fluid flow 218, which can be used for cooling, for a purge air in a turbomachinery seal between a rotor and a stator, or the like, is diverted from primary fluid flow 216 through first and second fluid diversion passages 320, 322. This diversion forces auxiliary fluid flow 218 to turn approximately 180° around second end 306 of first portion 302 and second end 318 of third portion 314 before entering auxiliary fluid passage 206. The clear area in FIG. 8 around first and second fluid diversion passages 320, 322 shows that particle entry into auxiliary fluid passage 206 is reduced and auxiliary fluid flow 218, which makes the turns at first and second fluid diversion passages 320, 322, contains fewer particles as shown in FIG. 9, discussed below.

In this alternative embodiment, the fluid passage height affects the amount of flow acceleration through primary fluid passage 204. A first primary fluid passage height 326 defined by second end 306 of first portion 302 and second wall 212. A second primary fluid passage height 328 is defined by second end 318 of third portion 314 and second wall 212. In this alternative embodiment, second primary fluid passage height 328 is less than first primary fluid passage height 326. First and second primary fluid passage heights 326 and 328 have a height within a range from greater than or equal to 10 percent of primary fluid passage radial height to less than or equal to 90 percent of primary fluid passage radial height. In some alternative embodiments, first and second primary fluid passage heights 326, 328 are equal height to one another.

In this alternative embodiment, the fluid diversion passage height affects the particle separation at first and second fluid diversion passages 320, 322. First fluid diversion passage 320 has a first gap height 330 defined by second end 306 of first portion 302 and first end 316 of third portion 314. Second fluid diversion passage 322 has a second gap height 332 defined by second end 318 of third portion 314 and first end 310 of second portion 308. In this alternative embodiment, first gap height 330 is substantially equal to second gap height 332. In some alternative embodiments, first and second gap heights 330, 332 are different from one another.

Figure 9:
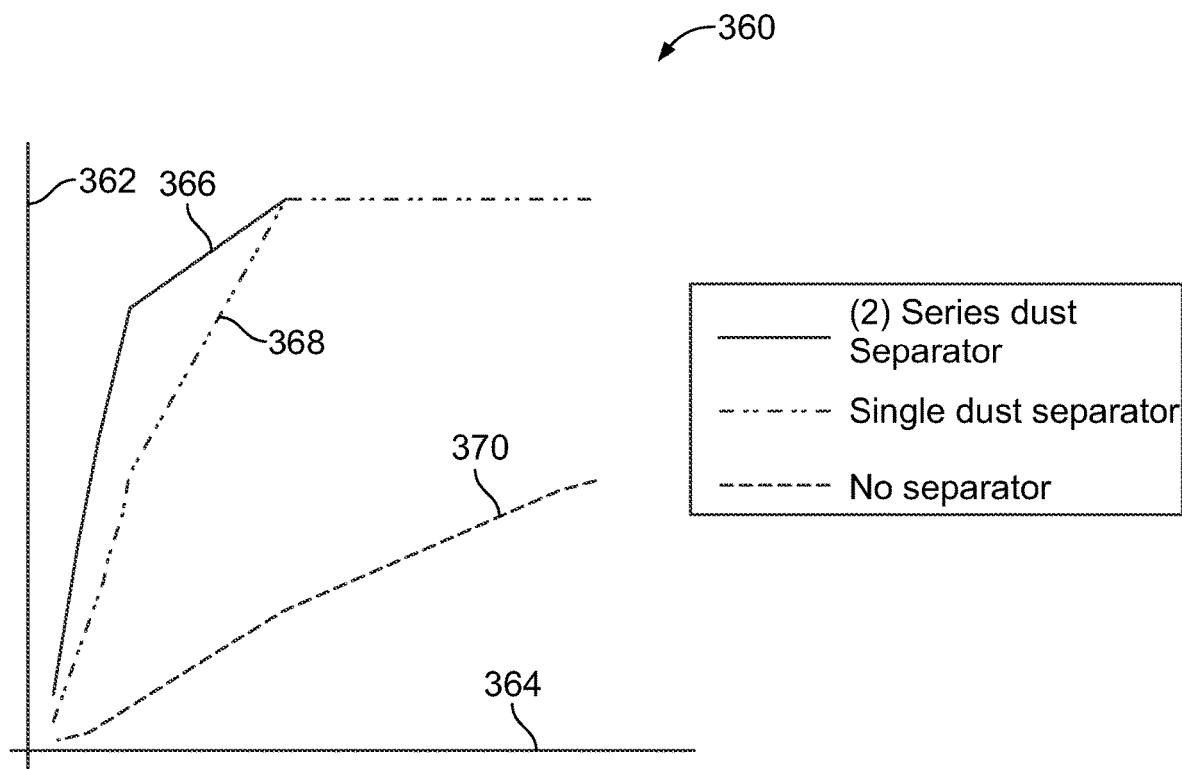
FIG. 9 is a separation graph for the particle separator shown in FIG. 6.

FIG. 9 is a separation graph 360 that includes a y-axis 362 defining efficiency of particle separation from auxiliary fluid flow 218. Graph 360 also includes an x-axis 364 defining a particle size. Graph 360 shows three efficiency of particle separation versus particle size curves for auxiliary fluid flow 218. The uppermost curve 366 is the curve for auxiliary fluid flow 218 with particle separator 300. The middle curve 368 is the curve for auxiliary fluid flow 218 with particle separator 200 as described above in reference to FIGS. 2-5. The lowermost curve 370 is the curve for auxiliary fluid flow 218 without particle separator 300. The higher the efficiency of particle separation, the cleaner the fluid is (e.g., the cleaner that the cooling air, purge air, or other liquid for the air cooled component or for another use).

Figure 10:
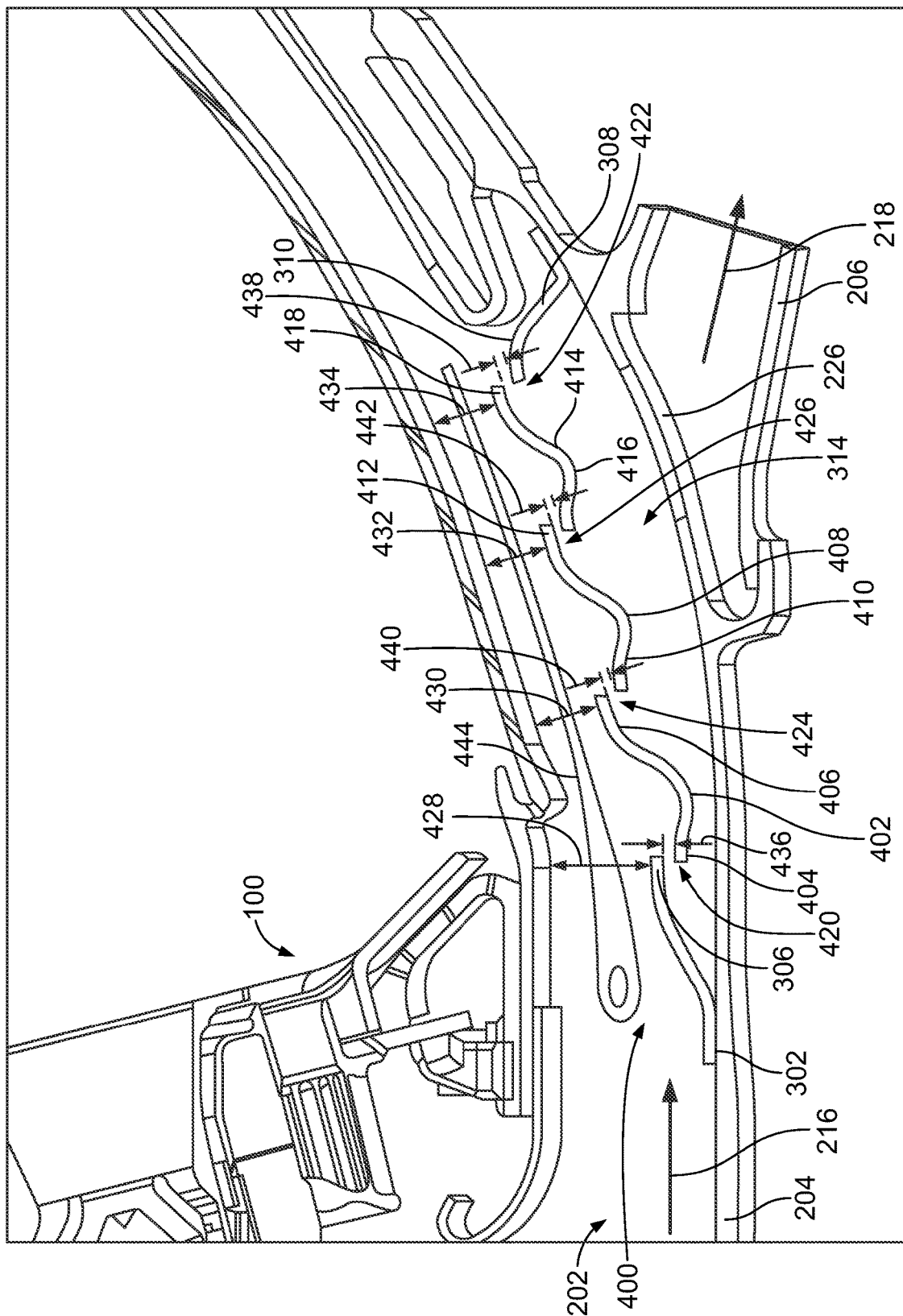
FIG. 10 is a schematic view of another alternative particle separator that may be used with the turbine engine shown in FIG. 1.

FIG. 10 is a schematic view of another alternative particle separator 400 that may be used with turbine engine 100. In this alternative embodiment, turbine engine 100 includes a handling system 202 that channels fluid toward another component as described above in reference to FIG. 2. Additionally, in this alternative embodiment, particle separator 400 includes a first portion 302, a second portion 308, and at least one third portion 314 as described above in reference to FIG. 6.

In this alternative embodiment, at least one third portion 314 further includes a first section 402, a second section 408, and third section 414. First section 402, second section 408, and third section 414 are between first portion 302 and second portion 308 as shown in FIG. 10. First section 402 has a first end 404 and a second end 406 opposite of first end 404. Second section 408 has a first end 410 and second end 412 opposite of first end 410. Third section 414 has a first end 416 and second end 418 opposite of first end 416. First section 402, second section 408, and third section 414 all extend axially in a direction defined by primary fluid flow 216 through primary fluid passage 204.

Also, in this alternative embodiment, first section 402, second section 408, and third section 414 are shown as substantially "S" shaped. For example, first end 404 of first section 402 has a local curvature radius (first curve in the "S") greater than or equal to 10 percent of first section 402 axial length, and second end 406 of first section 402 has a local curvature radius (second curve in the "S") greater than or equal to 20 percent of first section 402 axial length. Moreover, for example, second end 406 of first section 402 has a flap angle (end angle curved either towards first wall 214 or second wall 212) within a range from less than or equal to 10 degrees into second wall 212 (such that end angle curves toward second wall 212) to less than or equal to 60 degrees into first wall 214 (such that end angle curves towards first wall 214). The flap angle also has a local curvature radius of greater than or equal to 50 percent of third gap height 440 (discussed further below). Furthermore, for example, second end 406 of first section 402 and first end 410 of second section 408 are spaced from one another within a range from axially overlapping one another at a distance of approximately twice the third gap height 440 to having an axial gap between one another with a distance of approximately twice the third gap height 440. Also, for example, the angle between second end 406 of first section 402 and first end 410 of second section 408 is within a range from greater than or equal to 0 degrees (such that second end 406 of first section 402 and first end 410 of second section 408 are parallel) to less than or equal to 60 degrees. Alternatively, first section 402, second section 408, and third section 414 are other shapes, including, but not limited to, flat, "L" shaped, and "C" shaped. Additionally, in this alternative embodiment at least one third portion 314 is shown with three sections 402, 408, 414. In some alternative embodiments, at least one third portion 314 includes, but not limited to, two, five, and six sections.

Further, in this alternate embodiment, particle separator 400 includes a flow member 444 disposed within primary fluid passage 204 between second wall 212 and first portion 302, second portion 308, and at least one third portion 314. Flow member 444 extends axially in a direction defined by primary fluid flow 216 through primary fluid passage 204. Additionally, flow member 444 is disposed within primary fluid passage 204 at a radial distance from first wall 214 within a range from greater than or equal to 20 percent of primary fluid passage radial height to less than or equal to 90 percent of primary fluid passage radial height. Flow member 444 is configured to straighten and/or divide primary fluid flow 216. By creating a more uniform primary fluid flow 216, particle separation efficiency increases at particle separator 400. Flow member 444 is attached to at least one of first wall 214, second wall 212, first portion 302, second portion 308, and at least one third portion 314. In the exemplary embodiment, flow member 444 has a curvature that is substantially similar to the curvature of second wall 212. In alternative embodiments, flow member 444 may have any other shape that allows particle separator 400 to operate as described herein. In other alternative embodiments, particle separator 400 does not include flow member 444.

Additionally, in this alternative embodiment, first section 402, second section 408, and third section 414 are unitarily coupled to first portion 302 and second portion 308. In some alternative embodiments, first section 402, second section 408, and third section 414 are unitary. In yet some other alternative embodiments, first section 402, second section 408, and third section 414 are separate members that are coupled together. Particle separator 400 spans substantially circumferentially across primary fluid passage 204 and extending over cooling inlet hole 226. In some alternative embodiments, particle separator 400 is a discrete member that extending over cooling inlet hole 226 only and does not span circumferentially across primary fluid passage 204.

Moreover, in this alternative embodiment, at least one first fluid diversion passage 420 is defined by second end 306 of first portion 302 and first end 404 of first section 402. At least one second fluid diversion passage 422 is defined by second end 418 of third section 414 and first end 310 of second portion 308. At least one third fluid diversion passage 424 is defined by second end 406 of first section 402 and first end 410 of second section 408. At least one fourth fluid diversion passage 426 is defined by second end 412 of second section 408 and first end 416 of third section 414. First, second, third, and fourth fluid diversion passages 420, 422, 424, 426 are coupled in flow communication with primary fluid passage 204 and auxiliary fluid passage 206. First, second, third, and fourth fluid diversion passages 420, 422, 424, 426 divert fluid from primary fluid passage 204 to auxiliary fluid passage 206 in a direction that is opposed to primary fluid flow 216 through primary fluid passage 204.

In addition, in this alternative embodiment, a first primary fluid passage height 428 is defined by second end 306 of first portion 302 and second wall 212. A second primary fluid passage height 430 is defined by second end 406 of first section 402. A third primary fluid passage height 432 is defined by second end 412 of second section 408. A fourth primary fluid passage height 434 is defined by second end 418 of third section 414. In this alternative embodiment, second primary fluid passage height 430 is less than first primary fluid passage height 428, third primary fluid passage height 432 is less than second primary fluid passage height 430, and fourth primary fluid passage height 434 is less than third primary fluid passage height 432. First, second, third, and fourth primary fluid passage heights 428, 430, 432, and 434 have a height within a range from greater than or equal to 10 percent of primary fluid passage radial height to less than or equal to 90 percent of primary fluid passage height. In some alternative embodiments, first, second, third, and fourth fluid passage heights 428, 430, 432, 434 are of equal height to one another. Similar to particle separator 300 described above in reference to FIGS. 6-9, particle separator 400 accelerates particle-laden primary fluid flow 216 in an axial direction by reducing the cross-section area of primary fluid passage 204.

Also, in this alternative embodiment, first fluid diversion passage 420 has a first gap height 436 defined by second end 306 of first portion 302 and first end 404 of first section 402. Second fluid diversion passage 422 has a second gap height 438 defined by second end 418 of third section 414 and first end 310 of second portion 308. Third fluid diversion passage 424 has a third gap height 440 defined by second end 406 of first section 402 and first end 410 of second section 408. Fourth fluid diversion passage 426 has a fourth gap height 442 defined by second end 412 of second section 408 and first end 416 of third section 414. In this alternative embodiment, first gap height 436 is substantially equal to second gap height 438. First gap height 436 is also substantially equal to third gap height 440 and fourth gap height 442. In some alternative embodiments, first, second, third, and fourth gap heights 436, 438, 440, 442 are different from one another.

Similar to particle separator 300 described above in reference to FIGS. 6-9, particle-laden auxiliary fluid flow 218 turns approximately 180° about first, second, third, and fourth fluid diversion passages 420, 422, 424, 426 before entering into auxiliary fluid passage 206. The turns at first, second, third, and fourth fluid diversion passages 420, 422, 424, 426 separates heavier particles from auxiliary fluid flow 218. The heavier particles stay within primary fluid flow 216 and continue through primary fluid passage 204.

Figure 12:
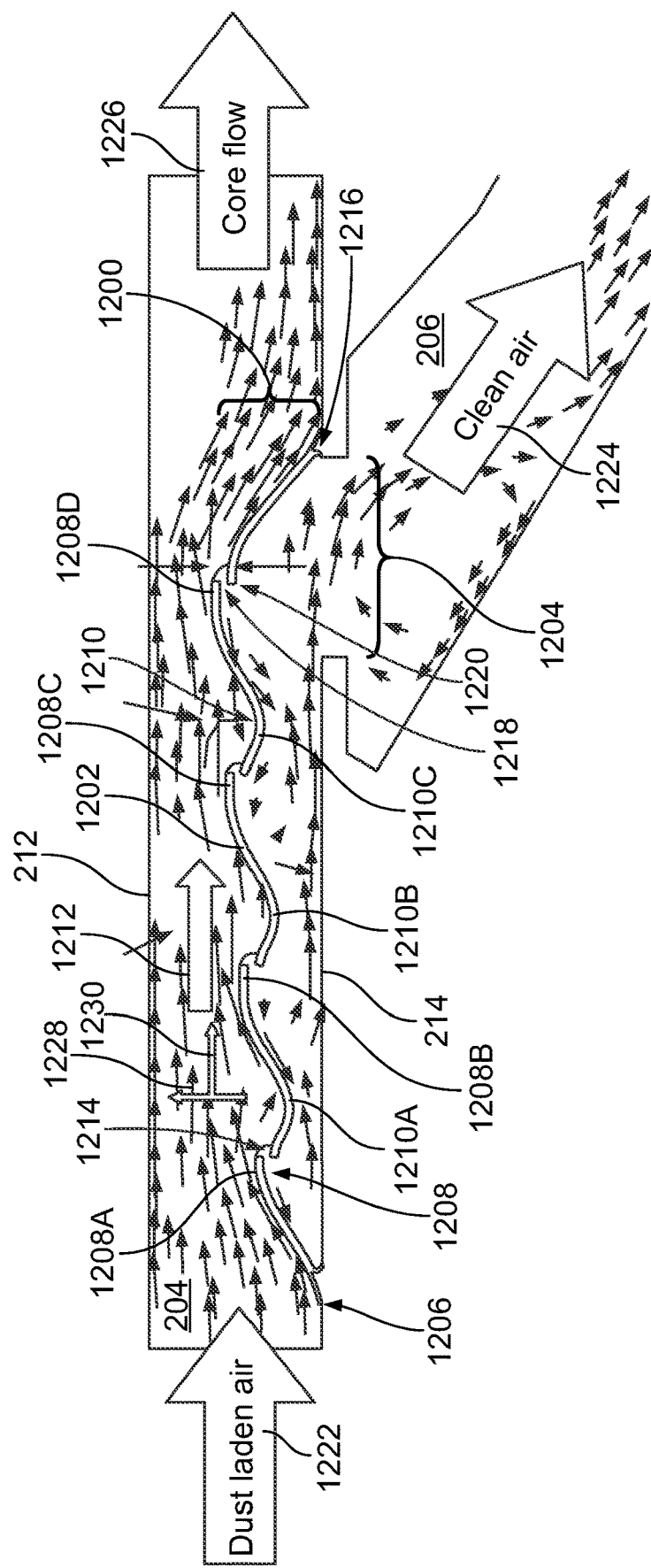
FIG. 12 is a schematic view of an alternative particle separator that may be used with the turbine engine shown in FIG. 1.

FIG. 12 is a schematic view of an alternative particle separator 1200 that may be used with the turbine engine 100 shown in FIG. 1. Alternatively, the particle separator 1200 can be used with another system. The particle separator 1200 includes a separator body 1202 that can be disposed in the primary fluid passageway 204 described above. A single cooling air bleed hole 1204 extends through the first wall 214 (also referred to as the radially inner or inward wall of the primary fluid passageway 204) to fluidly couple the primary fluid passageway 204 with the auxiliary fluid passageway 206 described above. Optionally, the inner wall 214 may include more than a single bleed hole 1204.

The separator body 1202 extends along a flow path or direction 1212 in which particle-laden fluid 1222 ("Dust-laden air" in FIG. 12, but not all embodiments are limited to air) flows in the primary fluid passageway 204 from an upstream end 1206 to an opposite downstream end 1216. In the illustrated embodiment, the upstream end 1206 of the separator body 1202 is upstream of the bleed hole 1204 and the downstream end 1216 of the separator body 1202 is downstream of the bleed hole 1204 along the flow path 1212 in the primary fluid passage way 204. Alternatively, the upstream end 1206 of the separator body 1202 may be closer to the bleed hole 1204 than what is shown in FIG. 12. The flow path 1212 radially extends along radial directions 1228 from the inner wall 214 to the outer wall 212. The flow path 1212 is elongated along axial directions 1230 such that the particle-laden fluid 1222 flows along the flow path 1212 between the walls 212, 214. The radial direction(s) 1228 radially extend outward from the centerline 126 of the turbomachine 100 and the axial direction(s) 1230 extend parallel to the centerline 126 of the turbomachine 100.

In the illustrated embodiment, the upstream end 1206 of the separator body 1202 is coupled with or sealed to the inner wall 214 and the downstream end 1216 of the separator body 1202 is coupled with or sealed to the inner wall 214. This coupling or sealing can enclose the bleed hole 1204 beneath the separator body 1202 along the radial direction(s) 1228. The sealing or coupling of the upstream end 1206 of the separator body 1202 to the inner wall 214 can prevent passage of the particle-laden fluid 1222 between the upstream end 1206 of the separator body 1202 and the inner wall 214. Alternatively, one or more portions (but not all) of the upstream end 1206 along a circumferential direction around the center line of the turbomachine may be separated from or spaced apart from the inner wall 214 in one or more locations along the radial direction(s) 1228.

The separator body 1202 shown in FIG. 12 has an undulating shape along the axial direction(s) 1230. This undulating shape is formed by the separator body 1202 having several crests 1208 (e.g., crests 1208A-D) and valleys 1210 (e.g., valleys 1210A-C) that are spaced apart from each other in the axial direction 1230. The crests 1208 are the peak portions of the separator body 1202 that radially extend farther from the inner wall 214 and/or centerline 126 of the turbomachine 100 along the radial directions 1228 than the valleys 1210. The valleys 1210 are the portions of the separator body 1202 that are closer to the inner wall 214 and/or centerline 126 of the turbomachine 100 than the crests 1208 along the radial directions 1228. The separator body 1202 shown in FIG. 12 includes four crests 1208 with three valleys 1210 between the crests 1208. Alternatively, the separator body 1202 can include fewer or more crests 1208 and/or valleys 1210. While the undulating shape in FIG. 12 shows the crests 1208 being separated from each other by valleys 1210 along the axial direction 1230, optionally, the separator body 1202 may additionally or alternatively have an undulating shape along the circumferential directions. For example, crests 1208 may be separated from each other by valleys 1210 along a direction extending into or out of the plane of FIG. 12 or along a path that encircles the centerline 126 of the turbomachine 100.

In the illustrated embodiment, different crests 1208 protrude different distances into the primary fluid passageway 204 along the radial directions 1228 from the inner wall 214. The crests 1208 located farther along the primary fluid passageway 204 in the axial direction 1230 can protrude farther into the primary fluid passageway 204, farther from the inner wall 214, and/or closer to the outer wall 212 than other crests 1208. For example, the crest 1208D extends farthest into the primary fluid passageway 204 of the crests 1208A-D, farthest from the inner wall 214 of the crests 1208A-D, and/or closest to the outer wall 212 of the crests 1208A-D. The crest 1208C extends farther into the primary fluid passageway 204 than the crests 1208A-B but not as far as the crest 1208D, farther from the inner wall 214 than the crests 1208A-B but not as far as the crest 1208D, and/or closer to the outer wall 212 than the crests 1208A-B but not as close as the crest 1208D, and so on. Alternatively, the crests 1208 located farther to the left in FIG. 12 may extend farther from the inner wall 214 than other crests 1208, the crests 1208 in the middle of the separator body 1202 may extend farther from the inner wall 214 than other crests 1208, or the crests 1208 may extend the same distance into the primary fluid passageway 204 from the inner wall 214.

Additionally in the illustrated embodiment, different valleys 1210 are located different distances from the inner wall 214 along the radial directions 1228. The valleys 1210 located farther along the primary fluid passageway 204 in the axial direction 1230 can be located farther from the inner wall 214 and/or closer to the outer wall 212 than other valleys 1210. For example, the valley 1210C can be located farthest from the inner wall 214 of the valleys 1210A-C and/or closest to the outer wall 212 of the valleys 1210A-C. The valley 1210B can be located farther from the inner wall 214 than the valley 1210A but not as far as the valley 1210C and/or closer to the outer wall 212 than the valley 1210A but not as close as the valley 1210C, and so on. Alternatively, the valleys 1210 located farther to the left in FIG. 12 may extend farther from the inner wall 214 than other valleys 1210, the valleys 1210 in the middle of the separator body 1202 may extend farther from the inner wall 214 than other valleys 1210, or the valleys 1210 may extend the same distance into the primary fluid passageway 204 from the inner wall 214.

The separator body 1202 includes several separator openings 1214. Alternatively, the separator body 1202 may have a single opening 1214 or may include a different number of the separator openings 1214 (than what is shown in FIG. 12). The separator openings 1214 extend through the entire thickness of the separator body 1202 such that fluid can flow through the separator body 1202 via or through the openings 1214. The remainder of the separator body 1202 may be solid or otherwise impermeable to the fluid 1222. For example, the portions of the separator body 1220 extending from the upstream edge 1206 to the first separator opening 1214 along the axial direction 1230, extending from the first separator opening 1214 to the next, second separator opening 1214 along the axial direction 1230, extending from the second separator opening 1214 to the next, third separator opening 1214 along the axial direction 1230, extending from the third separator opening 1214 to the next, fourth separator opening 1214 along the axial direction 1230, and extending from the fourth separator opening 1214 to the downstream edge 1216 may be impermeable to the fluid 1222 such that the fluid 1222 cannot pass through the separator body 1202 except through the separator opening(s) 1214.

In the illustrated embodiment, each separator opening 1214 is downstream of a different crest 1208 along the flow direction 1212. For example, each separator opening 1214 can be located downstream of one crest 1208 but upstream of the next valley 1210 and the next crest 1208 along the flow direction 1212. Alternatively, multiple separator openings 1214 can be downstream of at least one or each of the crests 1208 (and upstream of the next or subsequent crest 1208 along the flow direction 1212 in the primary fluid passageway 204).

Each separator opening 1214 can include an upstream edge 1218 and an opposing edge 1220. The upstream edges 1218 of the separator openings 1214 are located radially outward of the corresponding opposing edge 1220 for the same opening 1214 along the radial direction(s) 1228. For example, the upstream edge 1218 for a separator opening 1214 can be farther from the inner wall 214 than the opposing edge 1218 of the same separator opening 1214. The separation between the edges 1218, 1220 of an opening 1214 along a radial direction away from the centerline 126 of the turbomachine 100 can be referred to a step height h, as shown in FIG. 12. In one embodiment, the step height h is made as small as possible while still filtering at least a desired or threshold amount of the air 1222 (described below).

The separator openings 1214 provide access to and fluid coupling between the primary fluid passageway 204 and the auxiliary fluid passageway 206. In operation, the particle-laden fluid 1222 flows in the primary fluid passageway 204 and over the undulations formed by the crests 1208 and/or valleys 1210. These undulations can control a primary fluid velocity of the fluid and re-attachment points of the fluid. For example, the crests 1208 can accelerate the fluid and where different flow paths of the fluid re-combine after separating at the upstream edges 1218. Both this acceleration and re-combination of flow paths can increase the efficiency at which particles are separated from the fluid. For example, without the undulations, fewer particles may be separated from the fluid.

As the particle-laden fluid 1222 flows over the upstream edges 1218 of each separator opening 1214, a portion of the fluid 1222 flows over and bends around the upstream edge 1218 of the separator opening 1214 and then flows through the separator opening 1214 to the auxiliary fluid passageway 206. Because the particles (e.g., sand, dust, etc.) carried by the particle-laden fluid 1222 have significantly greater inertia than the air in the particle-laden fluid 1222, most or all the particles are unable to bend around the upstream edge 1218 of any separator opening 1214. Therefore, the particles continue to flow along the flow direction 1212 in the primary fluid passageway 204 (e.g., to the combustor of the turbomachine 100 or to another volume of the turbomachine 100).

The portion of the fluid 1222 that passes through any of the separator openings 1214 can be referred to as a filtered portion or diverted portion 1224 of the fluid 1222, while the remaining portion of the fluid 1222 that continues to flow along the flow direction 1212 in the primary fluid passageway 204 (and does not flow through any separator opening 1214) can be referred to as an unfiltered portion or non-diverted portion 1226 of the fluid 1222. The filtered or diverted portion 1224 of the fluid 1222 also is labeled as "Clean air" in FIG. 12 as this portion 1224 of the fluid 1222 carries fewer particles than the unfiltered or non-diverted portion 1226 of the fluid 1222 ("Core flow" in FIG. 12). Not all embodiments of the subject matter described herein are limited to filtering particles from air, however. The filtered or diverted portion 1224 can be directed around the combustor or combustor section 106 of the turbomachine 100 and can be directed to one or more other components. For example, the filtered portion 1224 of the fluid can be directed to one or more blades 125 to cool the blades 125 with the filtered fluid (and less or no particle-laden fluid, the filtered portion 1224 can be directed to a seal between a rotor and stator of the turbomachine 100 to prevent or reduce the introduction of particles into the seal, etc. In one embodiment, the fluid may be separated into the filtered and non-filtered portions in another location of the turbomachine or in another machine. The unfiltered or non-diverted portion 1226 of the fluid 1222 can be directed into the combustor or combustor section 106 of the turbomachine 100 for combustion, or can be directed to another location for another purpose.

The undulations formed by the crests 1208 and valleys 1210 of the separator body 1202 provide the undulating shape of the separator body 1202 along the axial direction 1230 of the turbomachine 100. For example, the crests 1208 are separated from each other along a direction that extend parallel to, that extend along, or that extend in one or more directions that are not perpendicular to the centerline 126 of the turbomachine 100. As described above, the undulations can help increase the separation of particles from the fluid.

Optionally, the separator body 1202 may alternatively or additionally include an undulating shape along one or more circumferential directions of the turbomachine 100. For example, the crests 1208 are shown as being separated from each other in the plane of FIG. 12, but additionally or alternatively may be separated from each other in directions that are perpendicular to the plane of FIG. 12. These circumferential directions may encircle the centerline 126 of the turbomachine 100. In one embodiment, the separator body 1202 has undulations only along the inner wall 214 and only along the axial direction of the turbomachine 100. In another embodiment, the separator body 1202 has undulations only along the inner wall 214 and only along circumferential directions of the turbomachine 100. In another embodiment, the separator body 1202 has undulations along the inner wall 214 in both the axial and circumferential directions of the turbomachine 100.

Figure 13:
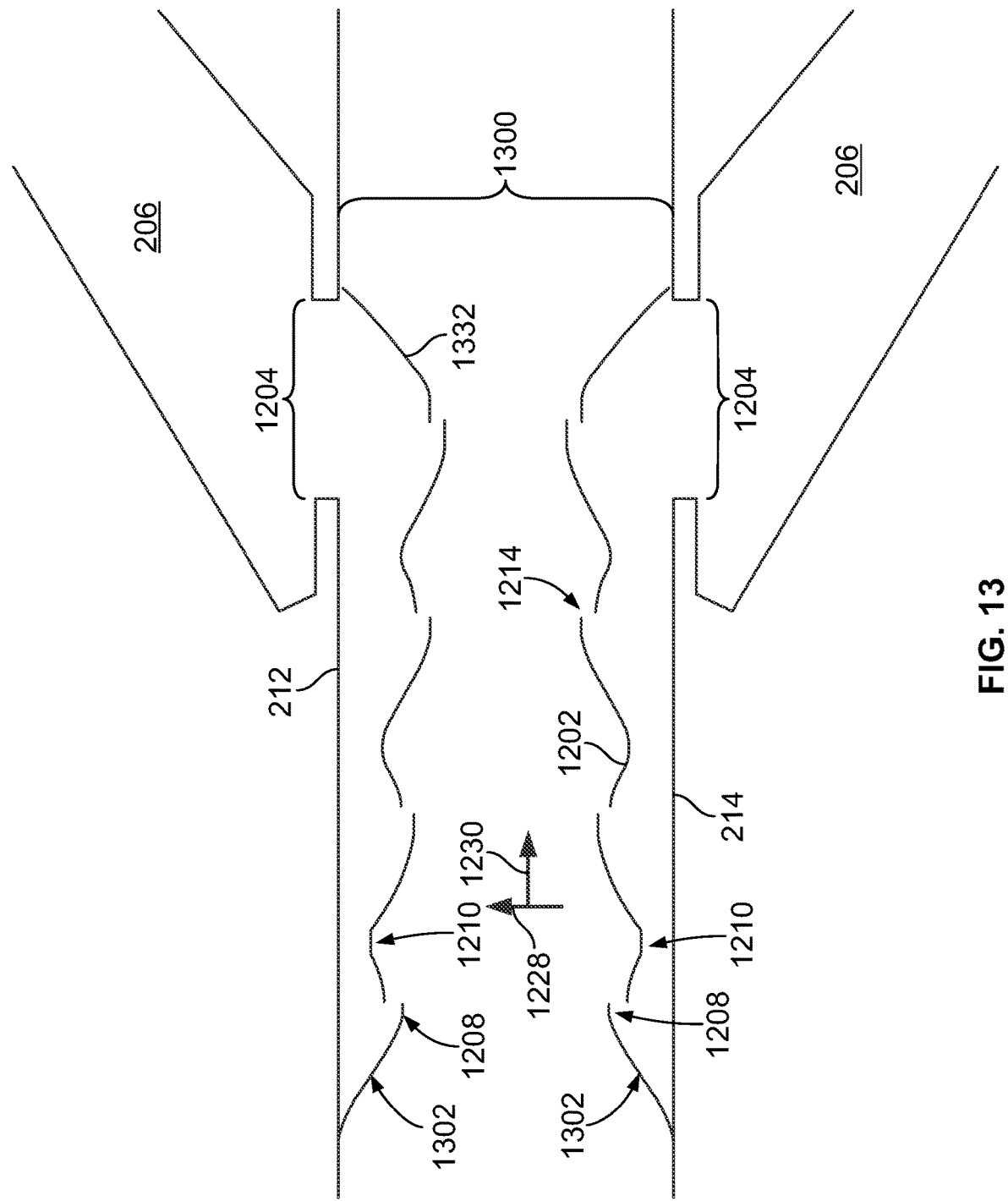
FIG. 13 is a schematic view of an alternative particle separator that may be used with the turbine engine shown in FIG. 1.

FIG. 13 is a schematic view of an alternative particle separator 1300 that may be used with the turbine engine 100 shown in FIG. 1. The particle separator 1300 includes a multi-part separator body 1302 that can be disposed in the primary fluid passageway 204 described above. The separator body 1302 includes the separator body 1202 shown in FIG. 12, but also includes an opposing separator body 1332. The separator body 1332 is coupled with the outer wall 212. The separator body 1332 extends along the flow path or direction 1212 from an upstream end 1306 to an opposite downstream end 1316. In the illustrated embodiment, the outer wall 212 also includes one or more air bleed holes 1204 that fluidly couple the primary fluid passageway 204 with another auxiliary fluid passageway, as described above in connection with the inner wall 214.

The separator body 1332 shown in FIG. 13 has an undulating shape along the axial direction 1230. This undulating shape is formed by the separator body 1332 having several of the crests 1208 and valleys 1210 that are spaced apart from each other in the axial direction 1230. The separator body 1332 may include the separator openings 1214 to separate particles from the fluid as the fluid passes between the separator bodies 1202, 1332. As described above, the undulating surface formed by the separator body 1332 can increase the efficiency at which particles are removed from the fluid. While the undulating shape in FIG. 13 shows the crests 1208 of the separator body 1332 being separated from each other by valleys 1210 along the axial direction 1230 only, optionally, the separator body 1332 may additionally or alternatively have an undulating shape along the circumferential directions. For example, crests 1208 in the separator body 1332 may be separated from each other by valleys 1210 along a direction extending into or out of the plane of FIG. 13 or along a path that encircles the centerline 126 of the turbomachine 100.

Optionally, the separator body 1332 may alternatively or additionally include an undulating shape along one or more circumferential directions of the turbomachine 100. The particle separators 1200, 1300 may include one or both separator bodies 1202, 1332 to provide for undulations along one or both the walls 212, 214, and/or along one or both the circumferential and/or axial directions.

One or more of the particle separators 1200, 1300 may be retrofitted to an existing turbomachine 100. For example, the turbomachine 100 may be manufactured and/or used without the particle separator 1200 and/or 1300 for one or more duty cycles. The separator bodies 1202 and/or 1332 may then be added to the walls 212 and/or 214 of the turbomachine 100 for use in one or more subsequent duty cycles. Alternatively, the turbomachine 100 may be manufactured with the particle separator 1200 and/or 1300 included in the turbomachine 100.

Figure 11:
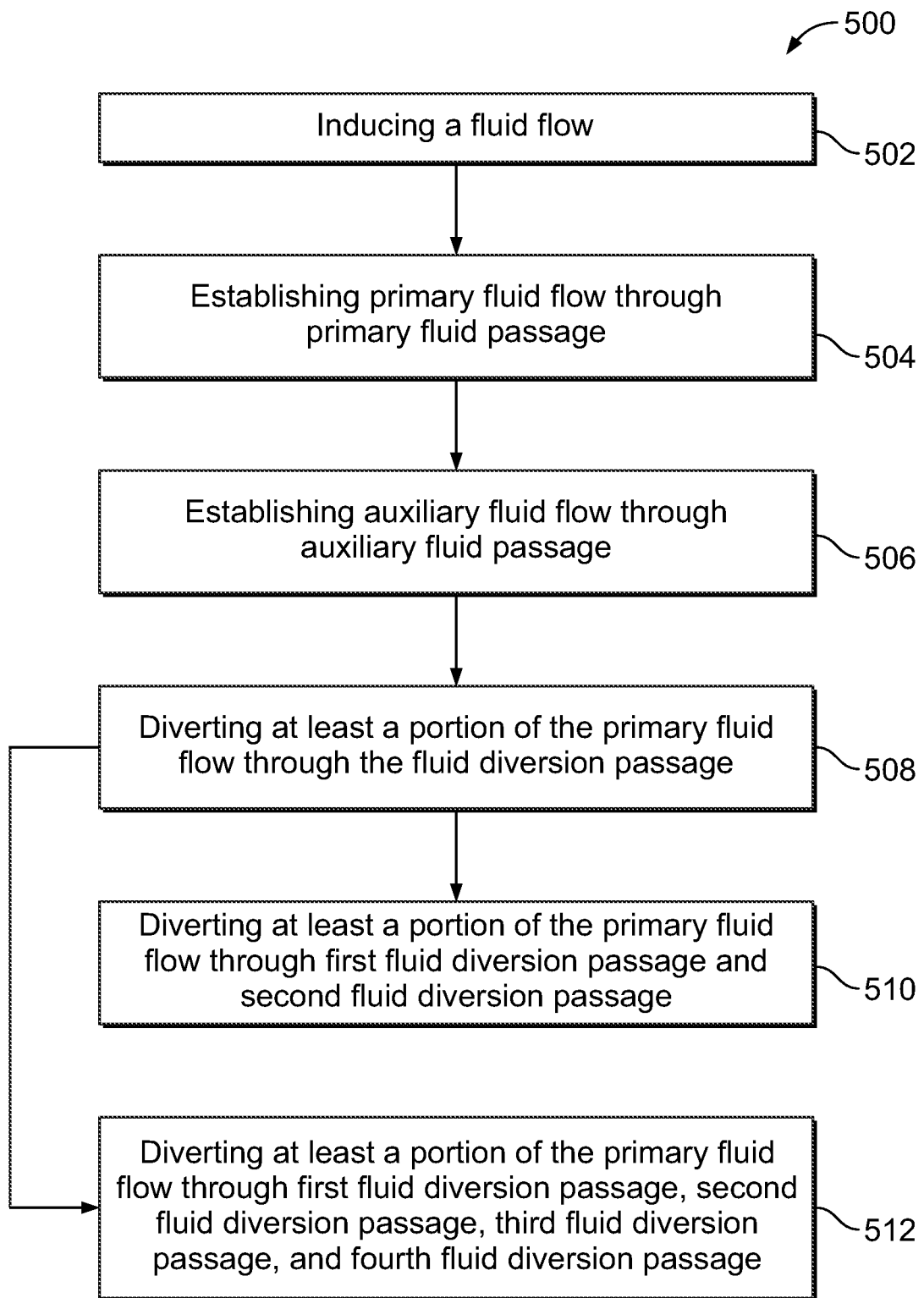
FIG. 11 is a flow diagram for an exemplary method of enhancing particle removal from a fluid flow in the turbine engine shown in FIG. 1.

An exemplary method 500 of enhancing particle removal from a fluid flow in turbine engine 100 (shown in FIG. 1) is illustrated in the flow diagram of FIG. 11. With reference to FIGS. 1-10, method 500 includes inducing 502 a fluid flow in turbine engine 100. Method 500 further includes establishing 504 primary fluid flow 216 through primary fluid passage 204. Also, method 500 includes establishing 506 auxiliary fluid flow 218 through auxiliary fluid passage 206. Establishing 506 auxiliary fluid flow 218 includes diverting 508 a portion of primary fluid flow 216 through fluid diversion passage 228 such that fluid diversion passage 228 diverts the fluid flow from primary fluid passage 204 to auxiliary fluid passage 206 in a direction opposed to the direction of fluid flow through primary fluid passage 204. This diversion can occur by the particle-laden air passing over one or more of the particle separator devices described herein and a portion of the particle-laden air passing over and bending around an upstream edge of a separator opening to direct a filtered portion of the air into the diversion passage and the auxiliary fluid passage.

In alternative embodiments, fluid diversion passage 228 is first fluid diversion passage 320 and establishing 506 auxiliary fluid flow 218 includes diverting 510 a portion of primary fluid flow 216 through first fluid diversion passage 320 and second fluid diversion passage 322 such that first fluid diversion passage 320 and second fluid diversion passage 322 diverts the fluid flow from primary fluid passage 204 to auxiliary fluid passage 206 in a direction opposed to the direction of fluid flow through primary fluid passage 204.

In other alternative embodiments, establishing 506 auxiliary fluid flow 218 includes diverting 512 a portion of primary fluid flow 216 through first fluid diversion passage 420, second fluid diversion passage 422, third fluid diversion passage 424, and fourth fluid diversion passage 426 such that first fluid diversion passage 420, second fluid diversion passage 422, third fluid diversion passage 424, and fourth fluid diversion passage 426 diverts the fluid flow from primary fluid passage 204 to auxiliary fluid passage 206 in a direction opposed to the direction of fluid flow through primary fluid passage 204.

Particle separating devices described herein provide a cost-effective method for reducing sand particles and/or particulate matter within systems (e.g., cooling systems) of turbomachines. Specifically, to reduce particles within the cooling system, the particle separators described herein utilize the difference in inertia between particles and air molecules as a separation mechanism. The particle separator is located over a cooling air extraction hole serving as a particle shield such that particles are restricted from directly entering the cooling passage. Additionally, the particle separator modifies a cross-sectional area of a flow passage, accelerating particle-laden flow therein. Cooling air is routed through a fluid diversion passage within the particle separator. Particle-laden flow turns approximately 180° at the fluid diversion passage such that particles with higher inertia are separated and carried downstream. As such, the number of particles traveling into the cooling passage is substantially decreased. The particle separators described herein offer advantages that include, without limitation, cost effective implementation and retro fit application. Additionally, the particle separators described herein, have a lower weight than many known particle separators, thereby reducing any weight penalties in an aircraft engine retrofit. Moreover, use of the particle separators describe herein maintain the effectiveness of cooling systems within turbomachines by reducing particle accumulation around small features such as rims, film cooling holes, and turbulators, which extends engine component service life, and reduces engine downtime and maintenance costs.

Exemplary embodiments of methods, systems, and apparatus for operating turbomachines are not limited to the specific embodiments described herein, but rather, components of systems and/or steps of the methods may be utilized independently and separately from other components and/or steps described herein. For example, the methods, systems, and apparatus may also be used in combination with other systems requiring reducing particles in a fluid flow, and the associated methods, and are not limited to practice with only the systems and methods as described herein. Rather, the exemplary embodiment can be implemented and utilized in connection with many other applications, equipment, and systems that may benefit from separating particles in a fluid flow.

In one embodiment, a particle separator is provided. The particle separator includes a separator body configured to be disposed in a primary fluid passageway of a turbomachine that directs a particle-carrying fluid along a flow path in the primary fluid passageway toward a combustor of the turbomachine. The primary fluid passageway of the turbomachine is located between an inner wall and an outer wall that is disposed radially outside of the inner wall from a centerline of the turbomachine. A rotor assembly of the turbomachine rotates around the centerline of the turbomachine. The primary fluid passageway includes one or more bleed holes through which a diverted portion of the fluid flowing in the primary fluid passageway toward the combustor is diverted into an auxiliary flow passageway that bypasses the combustor and directs the diverted portion of the fluid toward one or more components of the turbomachine that are downstream of the combustor in the turbomachine. The separator body extends along the flow path from an upstream end that is configured to be coupled with the inner wall of the primary fluid passageway. The separator body includes at least one upstream edge positioned to separate at least some particles carried by the fluid from the fluid as the diverted portion of the fluid bends around and flows over the at least one upstream edge of the separator body and into the auxiliary flow passageway via the one or more bleed holes while a non-diverted portion of the fluid continues to flow along the flow path in the primary fluid passageway.

Optionally, the separator body is configured to be located in the primary fluid passageway such that the separator body is disposed radially outward of the one or more bleed holes from the centerline of the turbomachine.

Optionally, the separator body has an undulating shape formed of plural crests and at least one valley. The crests can be shaped to radially extend farther into the primary fluid passageway and radially farther from the inner wall than the at least one valley.

Optionally, the separator body includes one or more separator openings disposed between the crests and the at least one valley. Each of the one or more separator openings can include at least one of the upstream edges of the separator body.

Optionally, each of the upstream edges of the separator body can be disposed downstream of a different crest of the crests in the separator body.

The separator body can have the undulating shape with the crests along an axial direction of the turbomachine.

The separator body may have the undulating shape with the crests along a circumferential direction of the turbomachine.

The separator body can have the undulating shape with the crests along both an axial direction and a circumferential direction of the turbomachine.

Optionally, separator body has a curved shape along the flow path of the fluid.

Optionally, the separator body can be a radially inward separator body, and the particle separator also can include a radially outward separator body configured to be coupled with the outer wall of the primary fluid passageway. The radially outward separator body can have one or more undulations.

Optionally, the separator body is shaped to be retrofitted to the primary fluid passageway of the turbomachine that was previously used to operate without the separator body in the primary fluid passageway.

In one embodiment, a method includes establishing a fluid flow of particle-laden fluid in a primary fluid passageway of a turbomachine that is defined by an inner wall and a radially outward wall relative to a centerline of the turbomachine, filtering a first portion of the particle-laden fluid by passing the particle-laden fluid over an undulating separator body having one or more separator openings, that is coupled with the inner wall of the primary fluid passageway, and that extends over at least one bleed hole through the inner wall. The first portion of the particle-laden fluid is filtered by the first portion of the particle-laden fluid bending around an edge of the separator body at the one or more separator openings and flowing into an auxiliary fluid passageway. A second portion of the fluid passes over the separator body without being filtered by the separator body. The method also includes directing the first portion of the fluid that is filtered around a combustor of the turbomachine to one or more downstream components of the turbomachine and cooling one or more components of the turbomachine using the first portion of the fluid while the second portion of the air is directed into the combustor of the turbomachine.

Optionally, filtering the first portion of the fluid includes passing the fluid over an undulating shape of the separator body.

Optionally, the one or more components of the turbomachine that are cooled include one or more turbine blades.

In one embodiment, a turbomachine includes a compressor section configured to receive particle-laden fluid and to at least partially compress the particle-laden fluid and a primary fluid passageway fluidly coupled with the compressor section and including opposing inner and radially outward walls. The primary fluid passageway is configured to receive the particle-laden fluid that is compressed by the compressor section. The primary fluid passageway includes one or more bleed holes in one or more of the inner wall or the outer wall that are fluidly coupled with an auxiliary flow passageway. The turbomachine also includes a combustor section fluidly coupled with the compressor section by the primary fluid passageway. The combustor section is configured to combust an unfiltered portion of the particle-laden fluid and form combustion gases. The turbomachine also includes a turbine section fluidly coupled with the combustor section and configured to receive the combustion gases from the combustor section. The turbine section includes turbine stages configured to be coupled with a rotor section and that are configured to be rotated by the combustion gases to rotate the rotor section. The turbine section also is fluidly coupled with the auxiliary flow passageway. The turbomachine also includes a separator body configured to be disposed in the primary fluid passageway downstream of the compressor section and upstream of the combustor section along a flow path of the particle-laden fluid. The separator body includes at least one upstream edge positioned to separate at least some particles carried from the particle-laden fluid as a diverted portion of the particle-laden fluid bends around and flows over the at least one upstream edge of the separator body and into the auxiliary flow passageway via the one or more bleed holes while a non-diverted portion of the particle-laden fluid continues to flow over the separator body and along the flow path in the primary fluid passageway to the combustor section. The auxiliary flow passageway bypasses the combustor section and directs the diverted portion of the fluid toward the turbine stages via the auxiliary flow passageway.

Optionally, the separator body is configured to be located in the primary fluid passageway such that the separator body is disposed one or more of radially outward or radially inward of the one or more bleed holes from the centerline of the turbomachine.

Optionally, the separator body has an undulating shape formed of plural crests and at least one valley. The crests are shaped to radially extend farther into the primary fluid passageway and radially farther from one or more of the inner wall or the outer wall than the at least one valley.

Optionally, the separator body includes one or more separator openings disposed between the crests and the at least one valley. Each of the one or more separator openings can include at least one of the upstream edges of the separator body.

Optionally, each of the upstream edges of the separator body is disposed downstream of a different crest of the crests in the separator body.

Optionally, the separator body has the undulating shape with the crests along one or more of an axial direction or a circumferential direction of the turbomachine.

In one embodiment, a particle separator includes a separator body configured to be disposed in a primary fluid passageway of a machine that directs a particle-carrying fluid along a flow path in the primary fluid passageway toward a volume of the machine. The primary fluid passageway located between opposing first and second walls. In one embodiment, these walls circumferentially extend around or encircle a centerline of the machine. Alternatively, these walls oppose each other without circumferentially extend around or encircle a centerline of the machine. For example, these walls may not be disposed in a rotating machine or a machine having a centerline. The primary fluid passageway includes one or more bleed holes through which a diverted portion of the fluid flowing in the primary fluid passageway is diverted into an auxiliary flow passageway that bypasses the volume and directs the diverted portion of the fluid toward one or more components of the machine that are outside of the volume of the machine. The separator body extends along the flow path from an upstream end that is configured to be coupled with the inner wall of the primary fluid passageway. The separator body includes at least one upstream edge positioned to separate at least some particles carried by the fluid from the fluid as the diverted portion of the fluid bends around and flows over the at least one upstream edge of the separator body and into the auxiliary flow passageway via the one or more bleed holes while a non-diverted portion of the fluid continues to flow along the flow path in the primary fluid passageway.

Optionally, the separator body is configured to be located in the primary fluid passageway such that the separator body is disposed outward of the one or more bleed holes and between the first and second walls.

Optionally, the separator body has an undulating shape formed of plural crests and at least one valley, the crests shaped to radially extend farther into the primary fluid passageway and farther from the first wall than the at least one valley.

Optionally, the separator body includes one or more separator openings disposed between the crests and the at least one valley, each of the one or more separator openings including at least one of the upstream edges of the separator body.

Optionally, each of the upstream edges of the separator body is disposed downstream of a different crest of the crests in the separator body.

Optionally, the separator body has the undulating shape with the crests along an axial direction of the machine.

Optionally, the separator body has the undulating shape with the crests along a first direction.

Optionally, the separator body has the undulating shape with the crests along both first and second orthogonal directions.

Optionally, the separator body has a curved shape along the flow path of the fluid.

Optionally, the separator body is a first separator body that is coupled with the first wall. The separator also can include a second separator body configured to be coupled with the second wall of the primary fluid passageway. The second separator body has one or more undulations.

Optionally, the separator body is shaped to be retrofitted to the primary fluid passageway of the machine that was previously used to operate without the separator body in the primary fluid passageway.

In one embodiment, a method includes establishing a fluid flow of particle-laden fluid in a primary fluid passageway of a machine that is defined by opposing first and second walls. These walls may circumferentially extend around or encircle the centerline of a machine having one or more rotating component. Alternatively, the walls may not circumferentially extend around or encircle the centerline of such a machine, the machine may not have a centerline, or the machine may not have a rotating component. The method also can include filtering a first portion of the particle-laden fluid by passing the particle-laden fluid over an undulating separator body having one or more separator openings that extends over at least one bleed hole through the first wall. The first portion of the particle-laden fluid is filtered by the first portion of the particle-laden fluid bending around an edge of the separator body at the one or more separator openings and flowing into an auxiliary fluid passageway. A second portion of the fluid passes over the separator body without being filtered by the separator body. The method also includes directing the first portion of the fluid that is filtered to one or more downstream components of the machine.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A particle separator comprises:
a separator body configured to be disposed in a primary fluid passageway of a machine that directs a particle-carrying fluid along a flow path in the primary fluid passageway toward a volume of the machine, the primary fluid passageway located between opposing first and second walls;
wherein the primary fluid passageway includes one or more bleed holes through which a diverted portion of the fluid flowing in the primary fluid passageway is diverted into an auxiliary flow passageway that bypasses the volume and directs the diverted portion of the fluid toward one or more components of the machine that are outside of the primary fluid passageway;
wherein the separator body extends along the flow path from an upstream end that is configured to be coupled with the first wall of the primary fluid passageway, the separator body including at least one upstream edge positioned to separate at least some particles carried by the fluid from the fluid as the diverted portion of the fluid bends around and flows over the at least one upstream edge of the separator body and into the auxiliary flow passageway via the one or more bleed holes while a non-diverted portion of the fluid continues to flow along the flow path in the primary fluid passageway; and
wherein the separator body has an undulating shape formed of plural crests and at least one valley, the crests shaped to extend farther into the primary fluid passageway and farther from the first wall than the at least one valley.

2. The particle separator of claim 1, wherein the separator body includes one or more separator openings disposed between the crests and the at least one valley, each of the one or more separator openings including the at least one upstream edge of the separator body.

3. The particle separator of claim 2, wherein the at least one upstream edge includes a plurality of upstream edges, and wherein each of the plurality of upstream edges of the separator body is disposed downstream of a different crest of the crests in the separator body.

4. The particle separator of claim 1, wherein the separator body is configured to be located in the primary fluid passageway such that the separator body is disposed outward of the one or more bleed holes and between the first and second walls.

5. The particle separator of claim 1, wherein the separator body has a curved shape along the flow path of the fluid.

6. The particle separator of claim 1, wherein the separator body is a first separator body that is coupled with the first wall, and further comprising a second separator body configured to be coupled with the second wall of the primary fluid passageway, the second separator body having one or more undulations.

7. A turbine engine comprising:
a compressor section configured to receive particle-laden fluid and to at least partially compress the particle-laden fluid;
a primary fluid passageway fluidly coupled with the compressor section and including opposing first and second walls, the primary fluid passageway configured to receive the particle-laden fluid that is compressed by the compressor section;
one or more bleed holes in the first wall or the second wall of the primary fluid passageway that are fluidly coupled with an auxiliary flow passageway; and
at least one separator body disposed in and extending along the primary fluid passageway downstream of the compressor section and arranged in the primary fluid passageway, wherein the at least one separator body comprises one or more bends and is configured to divert a first portion of the particle-laden fluid by flowing over and bending around a downstream side of the one or more bends, passing through at least one separator opening formed on the downstream side of the one or more bends and into the one or more bleed holes, and a second portion of the particle-laden fluid is non-diverted and passes over the at least one separator body without entering the at least one separator opening, wherein the first portion defines a filtered fluid having less particles than the second portion that defines an unfiltered fluid and wherein the one or more bends includes a crest shaped to radially extend farther into the primary fluid passageway and radially farther from one or more of the first wall or the second wall than an upstream portion of the at least one separator body.

8. The turbine engine of claim 7, wherein the one or more bends of the at least one separator body is formed of a plurality of crests and at least one valley, the crests shaped to radially extend farther into the primary fluid passageway and radially farther from one or more of the first wall or the second wall than the at least one valley.

9. The turbine engine of claim 8, wherein a primary fluid passage height measured at each of the plurality of crests decreases in a downstream direction.

10. The turbine engine of claim 8, wherein the at least one separator body includes the at least one separator opening disposed between the plurality of crests and the at least one valley, the at least one separator opening is defined in part by at least one upstream edge of the at least one separator body.

11. The turbine engine of claim 10, wherein the at least one separator opening is a plurality of separator openings, wherein each of the plurality of the separator openings defines a different gap height.

12. The turbine engine of claim 7, wherein the at least one separator body includes a first separator body and a second separator body.

13. The turbine engine of claim 12, wherein the first separator body couples to the first wall and the second separator body couples to the second wall.

14. The turbine engine of claim 13, wherein the first separator body or the second separator body form an undulating shape along a circumferential direction.

15. The turbine engine of claim 7, wherein the at least one separator body forms an undulating shape along a circumferential direction.

16. The turbine engine of claim 7, further comprising a combustor section fluidly coupled with the compressor section by the primary fluid passageway, the combustor section configured to combust an unfiltered portion of the particle-laden fluid and form combustion gases.

17. The turbine engine of claim 16, wherein the at least one separator body disposed in the primary fluid passageway is downstream of the compressor section and upstream of the combustor section.

18. The turbine engine of claim 16, wherein the auxiliary flow passageway bypasses the combustor section and directs the first portion of the particle-laden fluid towards at least one turbine stage via the auxiliary flow passageway.

19. The turbine engine of claim 18, wherein the first portion of the particle-laden fluid is directed to one or more turbine blades of the at least one turbine stage.

20. A turbine engine comprising:
a compressor section configured to receive particle-laden fluid and to at least partially compress the particle-laden fluid;
a primary fluid passageway fluidly coupled with the compressor section and including opposing first and second walls, the primary fluid passageway configured to receive the particle-laden fluid that is compressed by the compressor section;
one or more bleed holes in the first wall or the second wall of the primary fluid passageway that are fluidly coupled with an auxiliary flow passageway; and
at least one separator body comprising a circumferentially extending slat disposed in and extending along the primary fluid passageway downstream of the compressor section and arranged in the primary fluid passageway, wherein the at least one separator body comprises one or more bends and is configured to divert a first portion of the particle-laden fluid by flowing over and bending around a downstream side of the one or more bends, passing through at least one separator opening formed on the downstream side of the one or more bends and into the one or more bleed holes, and a second portion of the particle-laden fluid is non-diverted and passes over the at least one separator body without entering the at least one separator opening, wherein the first portion defines a filtered fluid having less particles than the second portion that defines an unfiltered fluid.

* * * * *